(12) United States Patent
Amarasingham et al.

(10) Patent No.: US 8,438,482 B2
(45) Date of Patent: May 7, 2013

(54) INTERACTIVE MULTIMEDIA CONTENT PLAYBACK SYSTEM

(75) Inventors: Simon Rumi Amarasingham, Alameda, CA (US); Julien Kemal Amarasingham, Watertown, MA (US)

(73) Assignee: The Adaptive Music Factory LLC, Alameda, CA (US)

( * ) Notice: Subject to any disclaimer, the term of this patent is extended or adjusted under 35 U.S.C. 154(b) by 218 days.

(21) Appl. No.: 12/853,324

(22) Filed: Aug. 10, 2010

(65) Prior Publication Data

US 2011/0041059 A1    Feb. 17, 2011

Related U.S. Application Data

(60) Provisional application No. 61/233,127, filed on Aug. 11, 2009.

(51) Int. Cl.
*G06F 3/14* (2006.01)
*G06F 3/17* (2006.01)

(52) U.S. Cl.
USPC ........ 715/716; 705/7.11; 348/14.01; 709/228

(58) Field of Classification Search .......... 715/200–277, 715/700–867; 700/701–866; 709/201–229; 705/50–79; 345/30–111
See application file for complete search history.

(56) References Cited

U.S. PATENT DOCUMENTS

| | | | |
|---|---|---|---|
| 4,526,078 A | 7/1985 | Chadabe | |
| 5,315,057 A | 5/1994 | Land et al. | |
| 6,442,658 B1 | 8/2002 | Hunt et al. | |
| 6,757,517 B2 | 6/2004 | Chang | |
| 6,822,153 B2 | 11/2004 | Comair et al. | |
| 6,933,432 B2 | 8/2005 | Shteyn et al. | |
| 7,102,069 B2 | 9/2006 | Georges | |
| 7,227,074 B2 | 6/2007 | Ball | |
| 7,319,185 B1 | 1/2008 | Wieder | |
| RE40,543 E | 10/2008 | Aoki et al. | |
| 7,957,991 B2* | 6/2011 | Mikurak | 705/7.11 |
| 8,161,172 B2* | 4/2012 | Reisman | 709/228 |
| 2006/0065104 A1 | 3/2006 | Ball | |
| 2006/0122842 A1 | 6/2006 | Herberger et al. | |
| 2007/0186752 A1 | 8/2007 | Georges et al. | |
| 2007/0245883 A1 | 10/2007 | Ball | |
| 2008/0030462 A1 | 2/2008 | Lasar | |
| 2008/0034392 A1 | 2/2008 | McCarthy et al. | |
| 2008/0053293 A1 | 3/2008 | Georges et al. | |
| 2008/0156176 A1 | 7/2008 | Edlund | |
| 2009/0016696 A1 | 1/2009 | Hsieh et al. | |
| 2012/0069131 A1* | 3/2012 | Abelow | 348/14.01 |

FOREIGN PATENT DOCUMENTS

| | | | |
|---|---|---|---|
| GB | WO2007000559 A1 | 1/2007 | |
| JP | 2006114208 A | 4/2006 | |

\* cited by examiner

*Primary Examiner* — Ruay Ho
(74) *Attorney, Agent, or Firm* — Ash Tankha; Lipton, Weinberger & Husick

(57) ABSTRACT

A computer implemented method and system is provided for controlling playback of multimedia content in real time. An interactive media application is provided to a first user and a second user. The first user defines multiple controls for the multimedia content and parameters associated with the defined controls using the interactive media application. The interactive media application renders a graphical representation of the defined controls with the multimedia content on an interface on the second user's computing device. The interactive media application acquires one or more control inputs from the second user. The control inputs provide a selection of values for the defined parameters associated with the defined controls. The interactive media application executes the defined controls based on the selected values for modifying one or more variables of the multimedia content. The interactive media application renders the multimedia content in accordance with the modified variables to the second user.

14 Claims, 14 Drawing Sheets

INTERACTIVE MULTIMEDIA CONTENT PLAYBACK SYSTEM

CROSS REFERENCE TO RELATED APPLICATIONS

This application claims the benefit of provisional patent application No. 61/233,127 titled "Interactive Multimedia Content Playback System", filed on Aug. 11, 2009 in the United States Patent and Trademark Office.

The specification of the above referenced patent application is incorporated herein by reference in its entirety.

BACKGROUND

The computer implemented method and system disclosed herein, in general, relates to a playback system. More particularly, the computer implemented method and system disclosed herein relates to controlling playback of multimedia content in real time.

Interactive music is used in some video games. The interactive music reacts to changes in the state of the game-play in real time and changes accordingly. Interactive music is also sometimes used in live performances and various other situations, with the common thread being that a software application accepts an input from an external source, for example, a video game, a live performer, etc. and uses the accepted input to influence assembly of some musical elements which are outputted as a stream of music customized to a situation. The above approach to music is also sometimes used in videos, for example, in generation or alteration of video imagery based on input in real time from some external source, for example, by a video jockey (VJ) in a nightclub setting. Moreover, some commercial products allow video editors to craft a music track to their videos. However, the variables of the video however, are not changed in real time. Furthermore, the variables that can be changed are fixed, that is, they remain the same for each piece of interactive music. Commercially available applications are either not aimed at casual users or give a user only indirect control over the interactive music. For example, in a video game with an interactive music score, the interactive music score reacts to events in the video game influenced by the user, but is not directly controlled by the user. As used herein, the "user" is a person who plays the video game, listens to interactive music, etc. created by an artist. The commercially available applications not only restrict the user's control over a piece of interactive music, but also restrict the control that can be given by the artist to the artist's audience.

Conventional playback systems do not cater to the needs of an artist creating interactive music as the conventional playback systems are not designed to allow the artist to make choices regarding the amount of control to be given to the user and the aspects of the music to be influenced by the user. As used herein, the "artist" is a person who creates multimedia content, for example, interactive music. The "user" is the person who plays or listens to the multimedia content, for example, interactive music created by the artist. Moreover, the conventional playback systems do not allow an artist to create each piece of interactive music with a different set of controls, which would make the choice of the controls a part of each artistic creation. Conventional playback systems that provide controls to the user tend to be based around editing of music and piecing the music together carefully usually against a timeline and not in real time. Conventional playback systems are provided for users knowledgeable in various multimedia fields, for example, music, audio editing, video editing, etc. Conventional playback systems are not intended for lay persons who do not have any kind of specialized knowledge in the multimedia fields. The conventional playback systems are generally not designed to allow lay persons to interact with the multimedia content in real time.

Hence, there is a long felt but unresolved need for an interactive multimedia content playback system that provides an artist the ability to expose different sets of controls to a user for each of the artist's multimedia creations, and that provides the user with direct control over multiple variables influencing playback of multimedia content.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for an interactive multimedia content playback system that provides an artist the ability to expose different sets of controls and parameters to a user for each of the artist's multimedia creations, and that provides the user with direct control over multiple variables influencing playback of multimedia content.

The computer implemented method and system disclosed herein controls playback of multimedia content in real time. In the computer implemented method and system disclosed herein, an interactive media application is provided for playing back the multimedia content. A first user, for example, an artist who authors or creates multimedia content, defines one or more of multiple controls for the multimedia content. The first user also defines parameters associated with the defined controls using the interactive media application. The interactive media application renders a graphical representation of the defined controls with the multimedia content on an interface displayed on a computing device of a second user. The second user is a person who plays back the multimedia content created by the first user and creates a personalized version of the multimedia content. The graphical representation of the defined controls is, for example, a toggle switch, a slidable control, a tactile control, a clickable control, etc. In an embodiment, the graphical representation of the defined controls with the multimedia content is rendered on the interface displayed on the second user's computing device in a three dimensional interactive environment for enabling the control of the playback of the multimedia content.

The interactive media application acquires one or more control inputs from the second user. The second user provides the control inputs to the interactive media application via multiple input modes, for example, a text input mode, a voice input mode, an audio input mode, a tactile input mode, etc. The control inputs acquired from the second user provide a selection of values for the defined parameters associated with the defined controls. The defined controls determine the modification of variables of the multimedia content based on the selected values of the defined parameters. In an embodiment, the defined controls permit the second user to modify a predetermined set of variables of the multimedia content.

The interactive media application executes the defined controls based on the selected values of the defined parameters for modifying one or more variables of the multimedia content. The interactive media application renders the multimedia content in accordance with the modified variables on the interface displayed on the second user's computing device. The modification of the variables of the multimedia content controls the playback of the multimedia content.

The interactive media application generates a first data file, a second data file, and a third data file using authoring tools. The first data file is a preset data file comprising data related to one or more playback patterns of the multimedia content. The second data file comprises data related to the defined controls, the defined parameters associated with the defined controls, information regarding one or more variables of the multimedia content to be modified corresponding to the defined parameters, modes of modifying the variables of the multimedia content, etc. The third data file comprises data related to locations of digital files constituting the multimedia content, the multimedia content, names of the variables of the multimedia content, information pertaining to time, duration, start time, and end time of the multimedia content, etc. In an embodiment, the interactive media application generates a single data file comprising data stored in the first data file, the second data file, and the third data file.

The interactive media application enables continuous modification of one or more variables of the multimedia content by acquiring the control inputs from the second user for controlling the playback of the multimedia content in real time. In an embodiment, the interactive media application renders multiple graphical representations of one or more of the defined controls with the multimedia content on the interface displayed on the second user's computing device for modifying different sets of the variables of the multimedia content.

In an embodiment, an instance of the interactive media application can be invoked on the second user's computing device for controlling playback of one or more pieces of multimedia content. The second user can therefore control multiple pieces of multimedia content in a single instance of the interactive media application.

In an embodiment, the interactive media application generates presets comprising the selection of values acquired from the control inputs of the second user for the defined parameters associated with the defined controls. The interactive media application acquires a selection of one or more of the generated presets from a subsequent user. The interactive media application renders the multimedia content in accordance with one or more variables modified by execution of the defined controls based on the selected presets to the subsequent user.

The computer implemented method and system disclosed herein allows the first user who authors or creates the multimedia content to present a unique audio and/or visual environment that allows the second user to explore and create personalized versions of the multimedia content.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
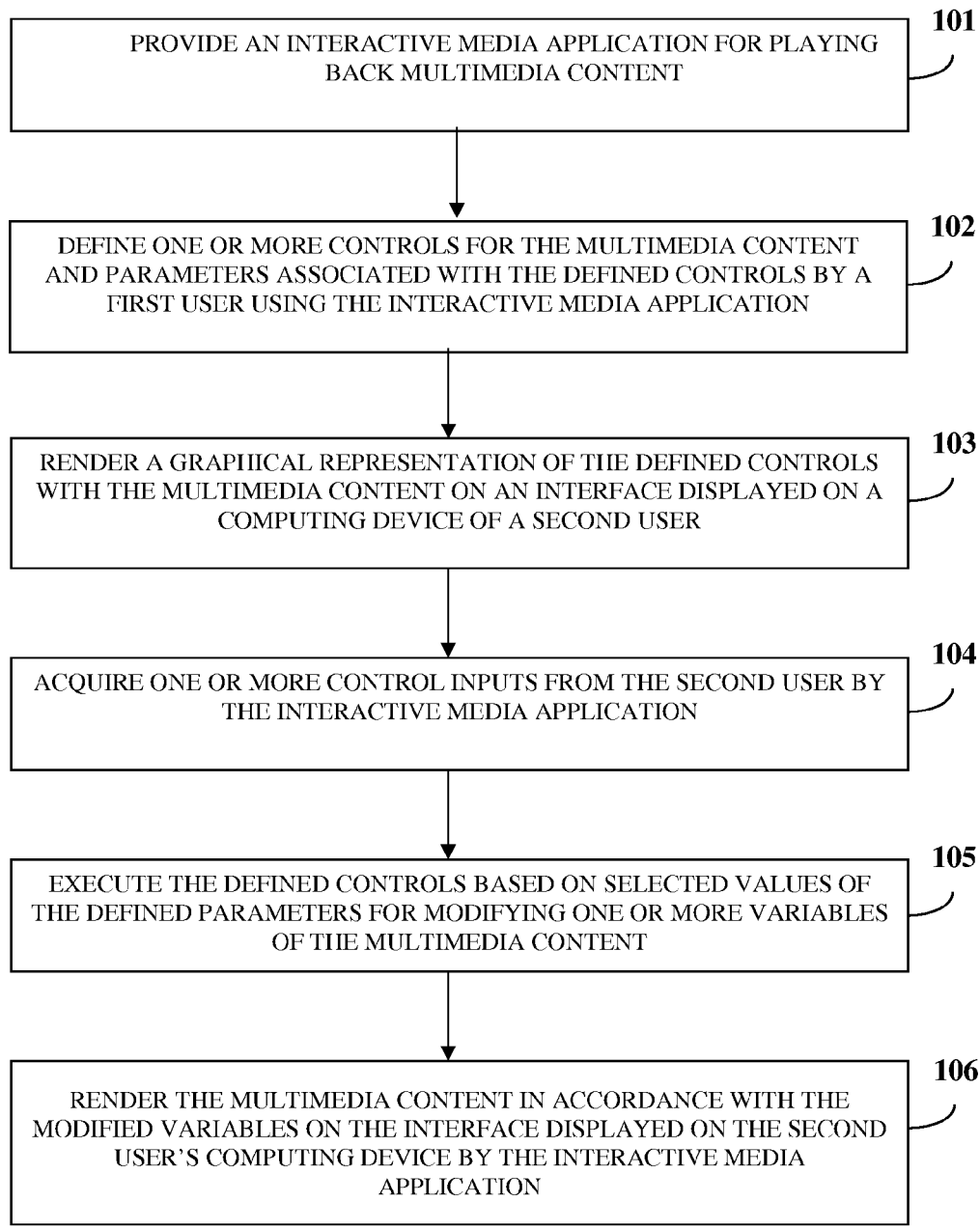
FIG. 1 illustrates a computer implemented method for controlling playback of multimedia content in real time.

FIG. 1 illustrates a computer implemented method for controlling playback of multimedia content in real time. As used herein, the term "multimedia content" refers to content in different combined and individual formats, for example, text, audio, video, still images, animations, and rich content formats. The multimedia content comprises, for example, audio content such as sound effects, spoken words, etc., video content, and any other media content that can be made interactive. The computer implemented method disclosed herein provides 101 an interactive media application for playing back the multimedia content. The interactive media application is a software implemented on computer hardware that defines, controls, modifies, and plays back the multimedia content based on the computer implemented method disclosed herein. A first user defines 102 one or more of multiple controls for the multimedia content and defines parameters associated with the defined controls using the interactive media application. As used herein, the "first user" is, for example, an artist or an interactive music composer who authors or creates the multimedia content and defines the controls and the parameters associated with the controls for the multimedia content. The first user authors the multimedia content for enabling a second user to playback the authored multimedia content. As used herein, the "second user" is a person who plays back the authored multimedia content and creates a personalized version of the authored multimedia content by modifying variables of the multimedia content.

The controls defined by the first user manage multiple variable attributes, herein referred to as "variables", of the multimedia content, for example, a volume level of a melody part of an interactive song; whether or not to play a sting part of the interactive song; a section or segment, for example, "verse", "chorus", etc. of the interactive song to be played; a sequence of video clips to be played concurrently with a particular piece of audio content; a piece of text to be displayed with a particular video clip, etc. As used herein, the term "parameters" refers to attributes of the defined controls. For example, the first user may define a "section" control 401 as exemplarily illustrated in FIG. 4 which represents musical sections of an interactive song. The parameters of the "section" control 401 are, for example, "verse", "chorus", and "bridge". The defined controls determine the modification in the variables of the multimedia content based on values of the defined parameters selected by the second user. For example, if the second user selects the "chorus" parameter, the interactive song being played back switches to the "chorus" section of the interactive song.

The interactive media application renders 103 a graphical representation of the defined controls with the multimedia content on an interface displayed on a computing device of the second user. As used herein, the term "graphical representation of the defined controls" refers to depicting the defined controls, for example, the "section" control 401 in the form of a graphical image such as a three way toggle switch 401*a* on the interface displayed on the second user's computing device as exemplarily illustrated in FIG. 4 and FIGS. 9A-9C. As used herein, the term "computing device" refers to any electronic device, for example, a mobile communication device, a tablet computing device, a personal computer, a laptop, a personal digital assistant, etc. that allows installation and execution of the interactive media application. As used herein, the term "interface" refers to a display rendered to the second user during playback of the multimedia content on the second user's computing device that allows the second user to interact with the played back multimedia content. The second user is, for example, a fan of the artist intending to listen, view, or modify the multimedia content authored by the artist using the interactive media application. The graphical representation of the defined controls is, for example, a toggle switch 401*a*, a slidable control, a tactile control, a clickable control, etc. In an embodiment, the interactive media application renders the graphical representation of the defined controls with the multimedia content on the interface displayed on the second user's computing device in a three dimensional interactive environment for enabling the control of the playback of the multimedia content. The interactive media application develops the graphical representation of the defined controls in a three dimensional space using different three dimensional graphics software. The three dimensional graphics software comprises, for example, a video game creation software such as Unreal® Engine of Epic Games, Inc. or Unity 3D® software of Unity Technologies. The three dimensional graphics software enables creation of three dimensional interactive environments for creation of the multimedia content, development of the graphical representation of the defined controls, modification of the variables of the multimedia content, etc. in the three dimensional interactive environments.

The interactive media application acquires 104 one or more control inputs from the second user. The second user provides the control inputs to the interactive media application by interacting with the rendered graphical representation of the defined controls. For example, the second user provides control inputs by interacting with a toggle switch 401*a* that graphically represents a "section" control 401 as exemplarily illustrated in FIG. 4 and FIGS. 9A-9C to switch from one musical section to another musical section in an interactive song. In another example, the second user provides control inputs by sliding a continuous controller 402*a* that graphically represents a "style" control 402 as exemplarily illustrated in FIG. 4 to transition the genre of the interactive song. In another example, the second user provides control inputs by sliding a continuous slider control 502*a* that graphically represents a "beat" control 502 as exemplarily illustrated in FIG. 5 to change a style of a beat in the interactive song. The second user provides the control inputs to the interactive media application via multiple input modes, for example, a text input mode, a voice input mode, an audio input mode, a video input mode, a tactile input mode, etc. The control inputs acquired from the second user provide a selection of values for the defined parameters associated with the defined controls. The second user can select one or more values for the defined parameters. The interactive media application executes 105 the defined controls based on the selected values of the defined parameters for modifying one or more variables of the multimedia content. In an embodiment, the defined controls permit the second user to modify a predetermined set of variables of the multimedia content. The interactive media application renders 106 the multimedia content in accordance with the modified variables on the interface displayed on the second user's computing device. The modification of the variables of the multimedia content controls the playback of the multimedia content.

Figure 2:
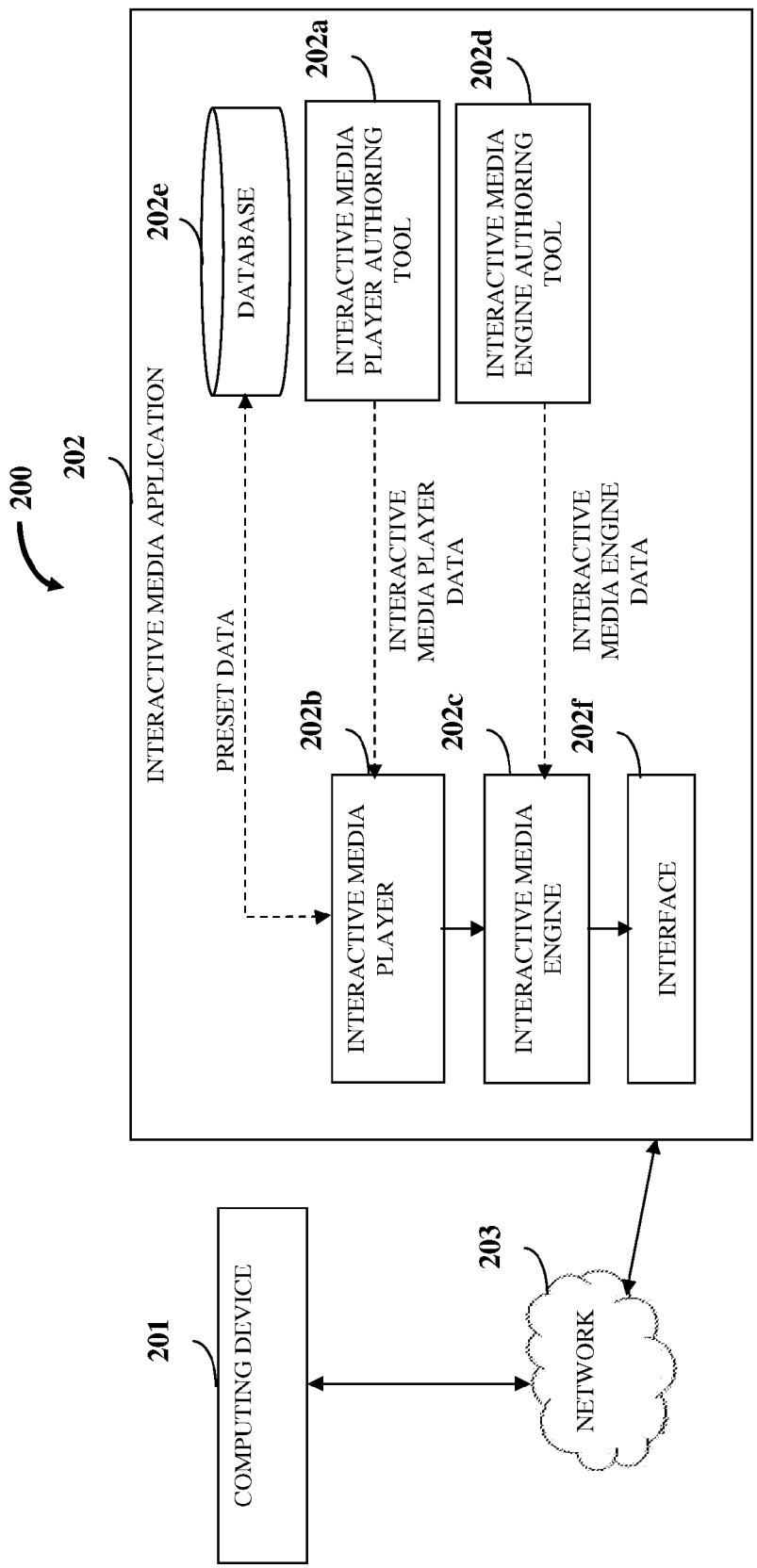
FIG. 2 illustrates a computer implemented system for controlling playback of multimedia content in real time.

The interactive media application generates a first data file, a second data file, and a third data file using authoring tools as disclosed in the detailed description of FIG. 2. The first data file herein referred to as a "preset data file" comprises data related to one or more playback patterns of the multimedia content. The second data file herein referred to as an "interactive media player data file" comprises data related to the defined controls, the defined parameters associated with the defined controls, information regarding one or more variables of the multimedia content to be modified corresponding to the defined parameters, modes of modifying the variables of the multimedia content, etc. The third data file herein referred to as an "interactive media engine data file" comprises data related to locations of digital files constituting the multimedia content, the multimedia content, names of the variables of the multimedia content, information pertaining to time, duration, start time, and end time of the multimedia content, etc. The preset data file, the interactive media player data file, and the interactive media engine data file are used in the definition of controls, the modification of variables of the multimedia content, and the rendering of the multimedia content in accordance with the modified variables as disclosed in the detailed description of FIG. 2. In an embodiment, the interactive media application generates a single data file comprising data stored in the preset data file, the interactive media player data file, and the interactive media engine data file.

The interactive media application enables continuous modification of one or more variables of the multimedia content by acquiring the control inputs from the second user for controlling playback of the multimedia content in real time. In an embodiment, a single instance of the interactive media application can be invoked on the second user's computing device for controlling playback of one or more pieces of multimedia content. The second user can therefore control multiple pieces of multimedia content in a single instance of the interactive media application.

The interactive media application renders each piece of multimedia content with a different set of the defined controls. The graphical representation of the defined controls is different for each piece of multimedia content. In an embodiment, the interactive media application renders multiple graphical representations of one or more of the defined controls with the multimedia content on the interface displayed on the second user's computing device for modifying different sets of the variables of the multimedia content. The interactive media application renders different graphical representations of the defined controls for a single piece of multimedia content to allow different modifications of the same piece of multimedia content by different users.

In another embodiment, the interactive media application generates presets comprising the selection of values acquired from the control inputs of the second user for the defined parameters associated with the defined controls. The interactive media application acquires a selection of one or more of the generated presets from a subsequent user and renders the multimedia content in accordance with the variables modified by execution of the defined controls based on the selected presets to the subsequent user. As used herein, the "subsequent user" refers to any person that plays multimedia content already played, and/or modified by the second user. Consider an example where the second user provides control inputs to reduce the vocals of an interactive music video called "Example Interactive Music and Video". The interactive media application modifies the variables of the "Example Interactive Music and Video" and renders the "Example Interactive Music and Video" with reduced vocals to the second user. The interactive media application generates a preset for the "Example Interactive Music and Video" with reduced vocals using the values selected by the second user for reducing the vocals of the interactive music video. In this example, the second user may send the generated preset, for example, by electronic mail (email), to the subsequent user. If the subsequent user has a copy of the interactive music video "Example Interactive Music and Video", the subsequent user may then select the generated preset for reduced vocals sent by the second user to apply the generated preset to the subsequent user's copy of "Example Interactive Music and Video". The interactive media application applies the generated preset for reduced vocals on the subsequent user's copy of "Example Interactive Music and Video" to modify the subsequent user's copy of "Example Interactive Music and Video" and renders the subsequent user's copy of "Example Interactive Music and Video" with reduced vocals to the subsequent user.

In another embodiment, the first user defines a common set of controls for a group of interactive multimedia content. The second user provides control inputs comprising a selection of values for the defined parameters associated with the common set of controls for modifying variables of a first piece of interactive multimedia content from the group of interactive multimedia content. The interactive media application generates presets comprising the selection of values acquired from the control inputs of the second user for the defined parameters associated with the defined controls. The second user may then apply the generated presets to a second piece of interactive multimedia content from the same group of interactive multimedia content to modify the same variables of the second piece of interactive multimedia content. Furthermore, the second user can transmit the generated presets to a subsequent user who owns pieces of interactive multimedia content from the same group of interactive multimedia content, for example, by electronic mail. The subsequent user may apply the generated presets to the subsequent user's pieces of interactive multimedia content from the same group of interactive multimedia content to modify the same variables of the subsequent user's pieces of interactive multimedia content.

FIG. 2 illustrates a computer implemented system 200 for controlling playback of multimedia content in real time. The computer implemented system 200 disclosed herein comprises an interactive media application 202 for playing back multimedia content. In an embodiment, the interactive media application 202 is accessible via a network 203. The network 203 is, for example, the internet, intranet, a local area network, a wide area network, a WiFi communication network, a Bluetooth™ communication network, an infra red communication network, etc. In another embodiment, the interactive media application 202 can be installed on a computing device 201 of each of the first user and the second user. In another embodiment, the interactive media application 202 is provided on physical storage media, for example, a digital versatile disc (DVD), a universal serial bus (USB), etc. and installed on the computing device 201 from the physical storage media. In another embodiment, the interactive media application 202 is, for example, hosted on a remote server. The first user and the second user access the interactive media application 202 stored on the remote server via the network 203. The computing device 201 of each of the first user and the second user interacts with the remote server and establishes a client-server relationship with the remote server. The computing device 201 downloads the files necessary to render the multimedia content from the remote server to the first user and the second user.

The computer implemented method and system 200 disclosed herein refers to providing multimedia content authored by a first user that is, for example, an author, an artist, etc. to a second user. However, the scope of the computer implemented method and system 200 disclosed herein may be extended to providing authored multimedia content to multiple second users and any subsequent users.

The interactive media application 202 comprises an interactive media player authoring tool 202a, an interactive media player 202b, an interactive media engine 202c, an interactive media engine authoring tool 202d, and a database 202e. The interactive media application 202 provides an interface 202f accessible by the first user and the second user.

The computer implemented system 200 disclosed herein enables customized installation of the interactive media application 202. For example, the first user authoring the multimedia content is required to install all the components, for example, 202a, 202b, 202c, 202d, and 202e of the interactive media application 202. However, the second user is not required to install components such as the interactive media player authoring tool 202a and the interactive media engine authoring tool 202d of the interactive media application 202. In another embodiment, the computer implemented system 200 disclosed herein enables the second user to download digital multimedia files, playback instructions, and digital images together with the interactive media application 202. The second user therefore receives the interactive media player 202b and the digital multimedia files to play on the interactive media player 202b.

The interactive media player 202b is an application for influencing playback of the multimedia content. The second user interacts with the interactive media player 202b, via the interface 202f, in real time for influencing the playback of the multimedia content. The interactive media engine 202c is a software application for playing back the multimedia content. In an embodiment, the interactive media engine 202c is a standalone application. In another embodiment, the interactive media player 202b and the interactive media engine 202c are integrated into a single multimedia application performing the functions of both the interactive media player 202b and the interactive media engine 202c. In an embodiment, the interactive media player authoring tool 202a and the interactive media engine authoring tool 202d are integrated into a single authoring application performing the functions of both the interactive media player authoring tool 202a and the interactive media engine authoring tool 202d. The interactive media player authoring tool 202a is an application used by the first user who authors the multimedia content for creating interactive media player data. The interactive media engine authoring tool 202d is an application used by the first user who authors the multimedia content for creating interactive media engine data. The interactive media engine authoring tool 202d enables the first user to author the multimedia content to provide the authored multimedia content to the second user.

The interactive media player 202b generates a first data file herein referred to as a "preset data file" comprising preset data related to one or more playback patterns of the multimedia content. The preset data comprises one or more playback patterns relating to a single piece of multimedia content. The interactive media player 202b records the playback patterns of the multimedia content on the preset data file. For example, the interactive media player 202b records the second user's interactions with the interface 202f and generates the preset data file comprising preset data related to one or more playback patterns of the multimedia content based on the second user's interaction with the interface 202f. The interactive media player 202b stores the preset data file in the database 202e. The second user may access the preset data file via the interface 202f to play back previously recorded playback patterns. Furthermore, the second user may transmit the preset data to a subsequent user for playing back the multimedia content as disclosed in the detailed description of FIG. 1.

In an embodiment, the interactive media player 202b generates preset data files based on the interactions of the first user with the interface 202f and stores the preset data files of the first user in the database 202e. The second user is therefore provided with some previously recorded playback patterns available from the preset data files of the first user stored on the database 202e, without the need for the second user to record any playback patterns.

The first user who authors the multimedia content uses the interactive media player authoring tool 202a for creating the interactive media player data. The interactive media player data comprises data for the display of controls rendered by the interactive media player 202b. The interactive media player data comprises control information for a single piece of multimedia content or for multiple pieces of multimedia content. The interactive media player authoring tool 202a generates a second data file herein referred to as an "interactive media player data file" comprising data related to the defined controls, the defined parameters associated with the defined controls, information regarding one or more variables of the multimedia content to be modified corresponding to the defined parameters, modes of modifying the variables of the multimedia content, data for display of the controls rendered by the interactive media player 202b, control information for the multimedia content, etc.

The first user uses the interactive media engine authoring tool 202d for creating the interactive media engine data. The interactive media engine data comprises, for example, locations of digital files constituting the multimedia content, for example, audio and video files, etc., the multimedia content, the names of multiple variables of the multimedia content, and information pertaining to time, duration, when the digital files should be started or stopped, when the states of the variables are changed, and other data required by the interactive media engine 202c. The interactive media engine data comprises information for a single piece of multimedia content or for multiple pieces of multimedia content. The interactive media player data and the interactive media engine data may be stored in a single data file. The interactive media engine authoring tool 202d generates a third data file herein referred to as an "interactive media engine data file" comprising data related to locations of digital files constituting the multimedia content, the multimedia content, names of the variables, information pertaining to time, duration, start time and end time of the multimedia content, etc.

Figure 4:
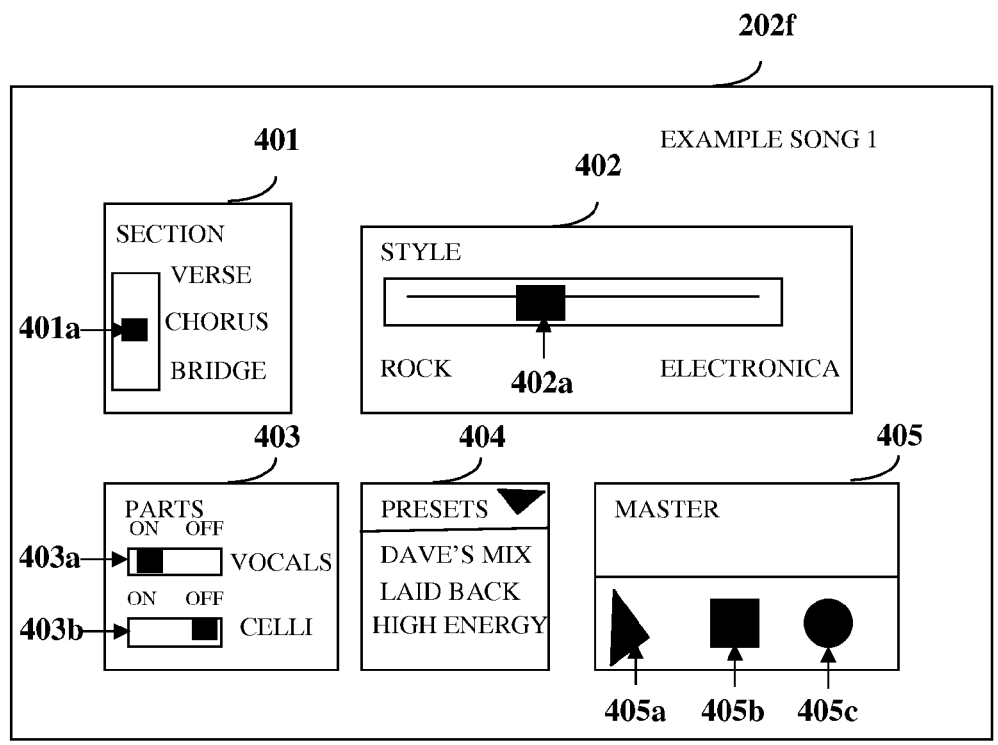
FIG. 4 exemplarily illustrates an interface for a sample piece of multimedia content named "Example Song 1".
Figure 5:
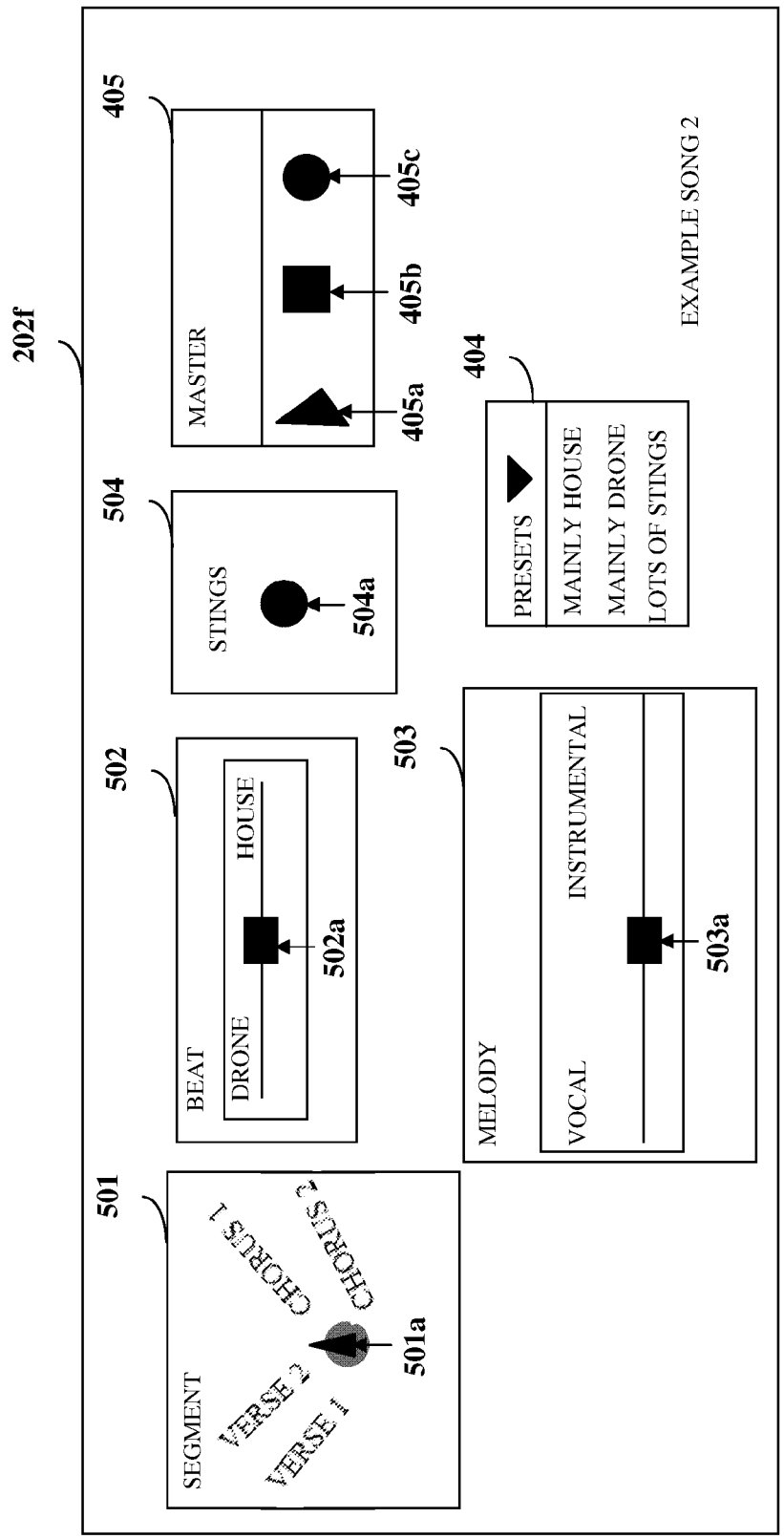
FIG. 5 exemplarily illustrates an interface for a sample piece of multimedia content named "Example Song 2".

A first user, for example, the artist, utilizes the interactive media player authoring tool 202a to define one or more of multiple controls, for example, a "section" control 401, a "style" control 402, a "beat" control 502, etc., as exemplarily illustrated in FIGS. 4-5, for the multimedia content and to define parameters associated with the defined controls. The interactive media player 202b renders a graphical representation of the defined controls, for example, one or more of a toggle switch 401a, a slidable control, a tactile control, a clickable control, etc. with the multimedia content on the interface 202f accessible on the second user's computing device 201. In an embodiment, the interactive media player 202b renders multiple graphical representations of one or more of the defined controls with the multimedia content on the interface 202f displayed on the second user's computing device 201 for modifying different sets of the variables of the multimedia content. Examples of the defined controls and the graphical representations of the defined controls with the multimedia content are exemplarily illustrated and disclosed in the detailed description of the FIGS. 4-8, FIG. 10, and FIGS. 13-14. The interactive media player 202b acquires one or more control inputs from the second user via the interface 202f. The control inputs provide a selection of values for the defined parameters associated with the defined controls. The interactive media engine 202c executes the defined controls based on the selected values of the defined parameters for modifying one or more variables of the multimedia content. The interactive media player 202b communicates with the interactive media engine 202c for rendering the multimedia content in accordance with the modified variables on the interface 202f displayed on the second user's computing device 201. The interactive media engine 202c in communication with the interactive media player 202b enables continuous modification of the variables of the multimedia content by acquiring the control inputs from the second user for controlling the playback of the multimedia content in real time. The interactive media engine 202c uses the interactive media engine data for playing back the multimedia content.

In an embodiment, the interactive media player 202b generates presets emulating the selection of values acquired from the control inputs of the second user for the defined parameters associated with the defined controls. The generated presets are available for selection by, for example, a subsequent user. The interactive media player 202b acquires the selection of one or more of the generated presets from the subsequent user. The interactive media player 202b renders the multimedia content in accordance with the variables modified by the execution of the defined controls based on the selected presets. The interactive media player 202b renders the graphical representation of the defined controls with the multimedia content on the interface 202f displayed on the second user's computing device 201 in a three dimensional interactive environment for enabling control of the playback of the multimedia content.

The database 202e stores the digital files that constitute the multimedia content, the generated presets for playback of the multimedia content, multiple controls for the multimedia content, multiple parameters associated with the defined controls, the data files, etc. The database 202e also stores the preset data, the interactive multimedia player data, and the interactive media engine data.

The interactive media player 202b and the interactive media player authoring tool 202a enable the artists and interactive music composers to provide a large variety of interfaces 202f to their audiences. These interfaces 202f provide the audiences different levels of interactivity and set the aesthetics of the interfaces 202f. The aesthetics of the interfaces can be set differently for different types of multimedia content. The interface 202f for each piece of multimedia content may be unique based on the preferences of the artists.

During playback of the multimedia content, the interactive media player 202b reads the interactive media player data describing a mode of rendering the graphical representation of one or more defined controls for the multimedia content. The interactive media player 202b renders the graphical representation of the defined controls to the second user via the interface 202f. The second user interacts with the rendered graphical representation of the defined controls for providing one or more control inputs to the interactive media player 202b. The control inputs provide a selection of values for the defined parameters associated with the defined controls. The interactive media player 202b acquires the control inputs and transmits messages in real time to the interactive media engine 202c in response to the acquired control inputs. The transmitted messages comprise information regarding the acquired control inputs and selection of values of the defined parameters corresponding to each of the acquired control inputs. The interactive media engine 202c executes one or more of the defined controls based on the transmitted messages for modifying the variables causing a change in state of the variables. The interactive media engine 202c monitors the change in the state of the variables. The changes in the state of the variables cause multiple effects on playback of the multimedia content in accordance with the interactive media engine data. The effects are, for example, starting or stopping of playback of the multimedia content, changing the volume of the multimedia content, applying equalization or other digital signal processing to the multimedia content, etc. The interactive media player 202b renders the multimedia content in accordance with the modified variables to the second user via the interface 202f. The multimedia content is played back through devices, for example, physical speakers, headphones, etc.

Figure 3:
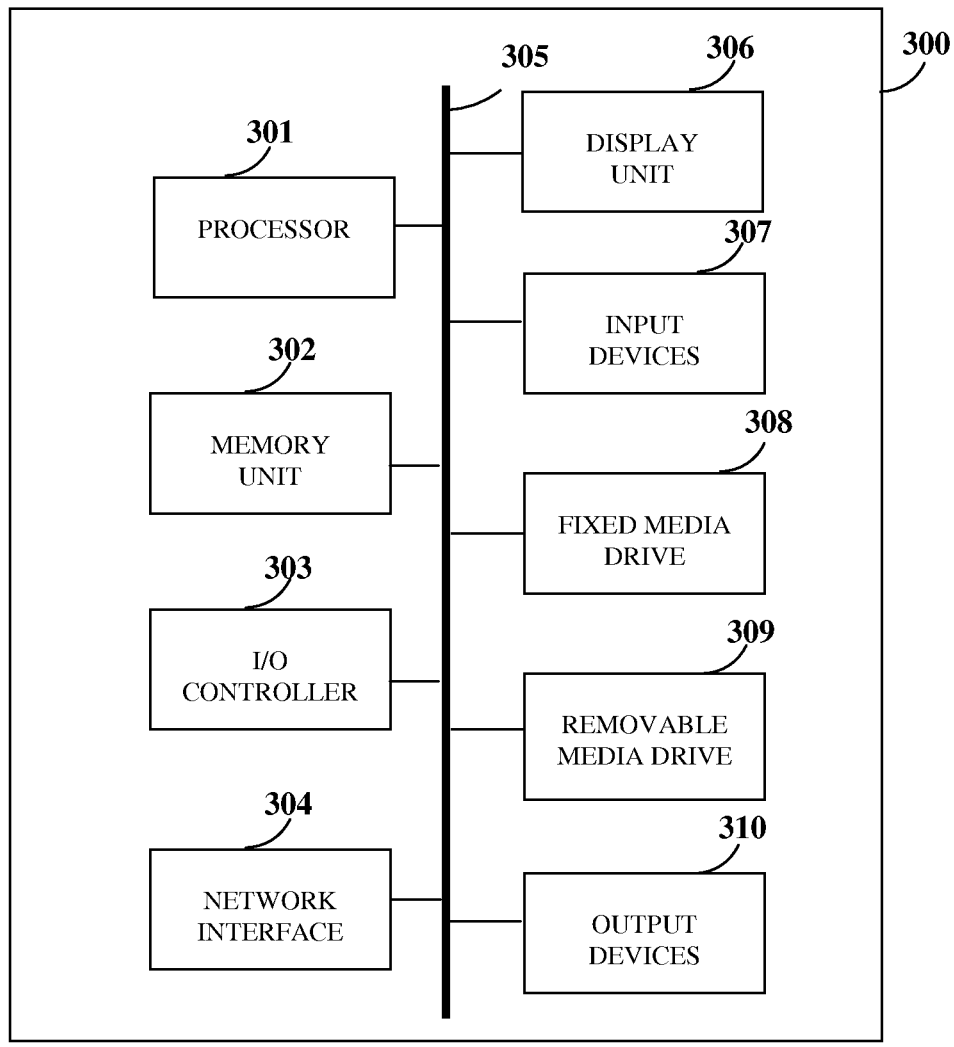
FIG. 3 exemplarily illustrates the architecture of a computer system for deploying an interactive media application.

FIG. 3 exemplarily illustrates the architecture of a computer system 300 for deploying an interactive media application 202. The computer system 300 comprises a processor 301, a memory unit 302 for storing programs and data, an input/output (I/O) controller 303, a network interface 304, and a display unit 306 communicating via a data bus 305. The data bus 305 permits communication between the modules, for example, 202a, 202b, 202c, 202d, 202e, etc. of the computer implemented system 200 disclosed herein.

The memory unit 302 is used for storing programs, applications, and data. For example, the interactive media application 202 is stored on the memory unit 302 of the computer system 300. The memory unit 302 comprises a random access memory (RAM), a read only memory (ROM), and other types of dynamic and static storage devices that store information and instructions for execution by the processor 301. The memory unit 302 also stores temporary variables and other intermediate information used during execution of the instructions by the processor 301. The computer system 300 further comprises one or more input devices 307, for example, a keyboard such as an alphanumeric keyboard, a mouse, a joystick, a touch-sensitive screen, a voice recognition system, etc. The input devices 307 are used for inputting data or providing the control inputs into the computer system 300. The I/O controller 303 controls the input and output actions performed by the first user and the second user. The computer system 300 communicates with other computer systems through the network interface 304, comprising, for example, a Bluetooth® interface, an infrared (IR) interface, a WiFi interface, a universal serial bus interface (USB), a local area network or wide area network (LAN or WAN) interface, etc. The network interface 304 enables connection of the computer system 300 to the network 203.

The computer system 300 further comprises a fixed media drive 308 and a removable media drive 309 for receiving removable media. In an embodiment, the computer system 300 has no removable media drive 309 and relies entirely on the network interface 304 for receiving new data. The computer system 300 further comprises output devices 310 for receiving and reading digital data on a compact disk, a digital versatile disk or a digital video disk or other medium. Computer applications or programs are used for operating the computer system 300. The programs are loaded onto the fixed media drive 308 and into the memory unit 302 of the computer system 300, for example, via the removable media drive 309. In an embodiment, the computer applications and programs may be loaded directly through the network 203. Applications are executed by double clicking a related icon or menu displayed on the display unit 306 using the input devices 307. The second user interacts with the computer system 300 using the interface 202f displayed on the display unit 306.

The computer system 300 employs an operating system for performing multiple tasks. The operating system is responsible for management and coordination of activities and sharing of resources of the computer system 300. The operating system further manages security of the computer system 300, peripheral devices connected to the computer system 300, and network connections. The operating system recognizes keyboard inputs and pointing device inputs of a user, output display, files and directories stored locally on the fixed media drive 308. Different programs, for example, a web browser, an electronic mail (email) application, etc. initiated by the first user or the second user are executed by the operating system with the help of the processor 301, for example, a central processing unit (CPU). The operating system monitors the use of the processor 301. The operating system on the computer system 300 executes different modules, for example, 202b, 202c, etc. initiated by the interactive media application 202 using the processor 301. The location of the instructions in the program memory is determined by a program counter (PC). The program counter stores a number that identifies the current position in the program of the interactive media application 202.

The instructions fetched by the processor 301 from the program memory after being processed are decoded. After processing and decoding, the processor 301 executes the instructions. For example, the interactive media player authoring tool 202a defines instructions for defining one or more of multiple controls for the multimedia content and parameters associated with the defined controls. The interactive media player 202b defines instructions for rendering a graphical representation of the defined controls with the multimedia content on an interface 202f displayed on the second user's computing device 201. The interactive media player 202b defines instructions for rendering multiple graphical representations of one or more of the defined controls with the multimedia content on the interface 202f displayed on the second user's computing device 201 for modifying different sets of the variables of the multimedia content. The interactive media player 202b defines instructions for rendering the graphical representation of the defined controls with the multimedia content on the interface 202f displayed on the second user's computing device 201 in a three dimensional interactive environment for enabling control of the playback of the multimedia content.

The interactive media player 202b defines instructions for acquiring one or more control inputs from the second user. The interactive media engine 202c defines instructions for executing the defined controls based on the selected values of the defined parameters for modifying one or more variables of the multimedia content. The interactive media player 202b in communication with the interactive media engine 202c defines instructions for rendering the multimedia content in accordance with the modified variables on the interface 202f displayed on the second user's computing device 201. The interactive media engine 202c in communication with the interactive media player 202b defines instructions for enabling continuous modification of the variables of the multimedia content by acquiring the control inputs from the second user for controlling the playback of the multimedia content in real time.

The interactive media player 202b defines instructions for generating the preset data file comprising data related to one or more playback patterns of the multimedia content. The interactive media player authoring tool 202a defines instructions for generating the interactive media player data file comprising data related to the defined controls, the defined parameters associated with the defined controls, information regarding the variables of the multimedia content to be modified corresponding to the defined parameters, modes of modifying the variables of the multimedia content, etc. The interactive media engine authoring tool 202d defines instructions for authoring the multimedia content by the first user to provide the authored multimedia content to the second user. The interactive media engine authoring tool 202d defines instructions for generating the interactive media engine data file comprising data related to locations of digital files constituting the multimedia content, the multimedia content, names of the variables of the multimedia content, information pertaining to time, duration, start time, and end time of the multimedia content, etc. The interactive media player 202b defines instructions for generating presets comprising the selection of values acquired from the control inputs of the second user for the defined parameters associated with the defined controls. The database 202e defines instructions for storing digital files that constitute the multimedia content, the generated presets for playback of the multimedia content, multiple controls for the multimedia content, multiple parameters associated with the defined controls, the data files, etc. The defined instructions are stored in the program memory or received from a remote server.

The processor 301 retrieves instructions defined by the interactive media player 202b, the interactive media player authoring tool 202a, the interactive media engine authoring tool 202d, the interactive media engine 202c, and the database 202e and executes the instructions.

Consider an example where the instructions from the interactive media engine 202c are stored in the memory unit 302. The multimedia content is transferred from the database 202e to the interactive media engine 202c. The second user initiates the execution of the interactive media engine 202c by double clicking on the icon for the interactive media engine 202c on the display unit 306 of the computing device 201 or the execution of the interactive media engine 202c is automatically initiated on transmitting multimedia content to the interactive media engine 202c. The locations of the instructions in the modules 202a, 202b, 202c, and 202d are determined by a program counter (PC). The program counter stores a number that identifies the current position in the program of the interactive media engine 202c. The instructions fetched by the processor 301 from the program memory after being processed are decoded. The instructions are placed in an instruction register (IR) in the processor 301. After processing and decoding, the processor 301 executes the instructions. At the time of execution, the instructions stored in the instruction register are examined to determine the operations to be performed. The processor 301 then performs the specified operations comprising, for example, arithmetic and logic operations.

The operating system performs multiple routines for performing a number of tasks required to assign the input devices 307, the output devices 310, and the memory unit 302 for execution of the interactive media engine 202c. The tasks performed by the operating system comprise assigning memory to the interactive media player 202b and the interactive media engine 202c and data, moving data between memory and disk units and handling input/output operations. The operating system performs the tasks on request by the operations and after performing the tasks, the operating system transfers the execution control back to the processor 301. The processor 301 continues the execution to obtain one or more outputs. The outputs of the execution of the interactive media player 202b and the interactive media engine 202c are displayed to the second user on the display unit 306.

Disclosed herein is also a computer program product comprising computer executable instructions embodied in a non-transitory computer readable storage medium. As used herein, the term "non-transitory computer readable storage medium" refers to all computer readable media, for example, non-volatile media such as optical disks or magnetic disks, volatile media such as a register memory, processor cache, etc., and transmission media such as wires that constitute a system bus coupled to the processor 301, except for a transitory, propagating signal. The computer executable instructions embodied on the non-transitory computer readable storage medium which when executed by the processor 301 cause the processor 301 to perform the method steps for controlling playback of multimedia content in real time.

The computer program product disclosed herein comprises multiple computer program codes for controlling playback of multimedia content in real time. For example, the computer program product disclosed herein comprises a first computer program code for providing the interactive media application 202 for playing back multimedia content, a second computer program code for defining one or more controls for the multimedia content and for defining parameters associated with the defined controls, and a third computer program code for rendering a graphical representation of the defined controls with the multimedia content on the interface 202f displayed on the second user's computing device 201. The computer program product disclosed herein further comprises a fourth computer program code for acquiring one or more control inputs from the second user, wherein the control inputs acquired from the second user provide a selection of values for the defined parameters associated with the defined controls, a fifth computer program code for executing the defined controls based on the selected values of the defined parameters for modifying one or more variables of the multimedia content, and a sixth computer program code for rendering the multimedia content in accordance with the modified variables on the interface 202f displayed on the second user's computing device 201. The computer program codes comprising the computer executable instructions for controlling playback of multimedia content in real time are embodied on the non-transitory computer readable storage medium. The processor 301 of the computer system 300 retrieves these computer executable instructions and executes them for controlling playback of multimedia content in real time.

For purposes of illustration, the detailed description refers to the interactive media application 202 being run locally on a computer system 300; however the scope of the computer implemented method and system 200 disclosed herein is not limited to the interactive media application 202 being run locally on the computer system 300 via the operating system and the processor 301 but may be extended to run remotely over the network 203 by employing a web browser and a remote server, a mobile phone, or other electronic devices.

The interactive media player 202b provides a different set of defined controls and defined parameters for different multimedia content as exemplarily illustrated in FIGS. 4-8. The interfaces 202f illustrated in FIGS. 4-8 illustrate how a single interactive media player 202b presents the second user with different sets of controls by reading data from different interactive media player data files.

FIG. 4 exemplarily illustrates an interface 202f for a sample piece of multimedia content named "Example Song 1". The interface 202f, exemplarily illustrated in FIG. 4, displays a "section" control 401, a "style" control 402, a "parts" group of controls 403, a "presets" drop down list 404, and a "master" group of controls 405. The "section" control 401 provides a three way toggle switch 401a for selecting one or more of multiple musical sections, for example, "verse", "chorus", and "bridge" of the "Example Song 1".

The musical sections, for example, "verse", "chorus", and "bridge" are the parameters defined for the "section" control 401. The "style" control 402 provides a continuous controller 402a for transitioning the genre of the "Example Song 1" from, for example, "rock" at the extreme left hand position to "electronica" at the extreme right hand position. The genre "rock" and "electronica" are the parameters defined for the "style" control 402. The "parts" group of controls 403 comprises a pair of toggle switches 403a and 403b comprising a first toggle switch 403a for switching the vocals in the multimedia arrangement on or off and a second toggle switch 403b for switching the celli part of the multimedia arrangement on or off. "Vocal" and "celli" are the parameters defined for the "parts" group of controls 403. The "presets" drop down list 404 allows recalling of previously recorded movements of the controls. The previously recorded movements of the controls are stored as presets such as "Dave's Mix", "Laid Back", and "High Energy" presets. The "master" group of controls 405 comprises a play button 405a, a stop button 405b, and a record button 405c.

FIG. 5 exemplarily illustrates an interface 202f for a sample piece of multimedia content named "Example Song 2". The interface 202f displays a "segment" control 501, a "beat" control 502, a "melody" control 503, a "stings" control 504, a "master" group of controls 405, and a "presets" drop down list 404. The term "sting" refers to a short musical phrase in the "Example Song 2". The "segment" control 501 is graphically represented by a rotary dial 501a for selecting parameters "verse1", "verse2", "chorus1", or "chorus2". The "segment" control 501 is similar to the "section" control 401 disclosed in the detailed description of FIG. 4, however in this case, the control is named differently, provides a rotary dial 501a instead of a vertical multi-position toggle switch 401a, and has a different set of options. The interactive media player 202b therefore displays different variations of controls for different pieces of multimedia content. The "beat" control 502 provides a continuous slider control 502a for changing a style of a beat in the "Example Song 2" from, for example, a "drone" style at the far left to a "house" style at the far right.

The "melody" control 503 provides a continuous slider control 503a for controlling an instrument playing a main melody from "vocal" on the far left to "instrumental" on the far right. The "stings" control 504 is a push-button trigger 504a for playing randomly selected, short musical stings over the multimedia content. Once the playing of the sting finishes, the push-button trigger 504a pops back up in readiness for re-triggering.

The "presets" drop down list 404 comprises previously recorded interactions with the graphical representation of the defined controls, herein referred to as "presets", and allows recalling of the presets, for example, "mainly house", "mainly drone", and "lots of stings" as exemplarily illustrated in FIG. 5. The "master" group of controls 405 allows the second user to control start 405a of the playback of the multimedia content, stop 405b of the playback of the multimedia content, and to record 405c the presets. In an embodiment, the "master" group of controls 405 and the "presets" drop down list 404 is commonly displayed for all types of multimedia content. The presets are recorded by pressing the record button 405c. The second user uses the presets for subsequently altering the states of the variables of the multimedia content other than the "master" group of controls 405 and the "presets" drop down list 404. In an embodiment, multiple presets are created for a single piece of multimedia content and the contents of the preset data files are displayed in the "presets" drop down list 404. The graphical representation of the controls defined for the sample piece of multimedia content named "Example song 2", exemplarily illustrated in FIG. 5, may or may not be similar in appearance to the graphical representation of the controls defined for the sample piece of multimedia content named "Example song 1" exemplarily illustrated in FIG. 4 and holds no direct equivalence with any of the defined controls and the defined parameters for the "Example song 1". The computer implemented method and system 200 disclosed herein allows an artist to expose different sets of defined controls and defined parameters for each of the multimedia content creations. The exposed defined controls and the defined parameters differ in type, number, appearance, etc.

Consider an example where the interactive media player 202b presents a second user with an interface 202f displaying graphically represented controls as exemplarily illustrated in FIG. 4. The second user presses the record button and then selects "verse" in the "section" control 401. The second user then slides the "style" control 402 from "rock" to "electronica" over a course of 5 seconds and then switches the "section" control 401 to "chorus". The interactive media player 202b stores the above mentioned sequence of interactions with the graphically represented controls in the preset data file as a new preset. The interactive media player 202b prompts the second user to name the new preset. The second user names the new preset as "my version". When the second user selects the "my version" preset from the "presets" drop down list 404, the sequence of interactions stored in the "my version" preset is performed, causing the "section" control 401 to switch automatically to "verse", and then causing the "style" control 402 to automatically slide from "rock" to "electronica" over the course of 5 seconds, and then causing the "section" control 401 to automatically switch to "chorus." In an embodiment, the preset data is transmitted to a subsequent user who uses a computing device 201 comprising another instance of the interactive media player 202b and the interactive media engine 202c running on different hardware and comprising the same interactive media player data and interactive media engine data for "Example Song 1". Consider, for example, the subsequent user views the preset "my version" appearing on the subsequent user's "presets" drop down list 404. The subsequent user plays back the "my version" preset with the same results as that of the second user playing back the "my version" on the interactive media player 202b and the interactive media engine 202c running on hardware different from that of the subsequent user.

Consider another example where the first user authors an interactive song using the interactive media application 202. The first user defines a first set of controls, for example, a "segment" control 501 and a "beat" control 502 for the interactive song. The first user also defines a second set of controls, for example, a "melody" control 503 and a "stings" control 504 for the same interactive song. The interactive media player 202b renders a graphical representation of the first set of controls with the interactive song to the second user. The interactive media player 202b also renders a graphical representation of the second set of controls with the same interactive song to the second user. The second user can therefore modify the same interactive song in different ways.

In another example, the first user defines controls, for example, a "segment" control 501, a "beat" control 502, and a "melody" control 503 for an interactive song. The interactive media player 202b renders multiple graphical representations of the defined controls for the interactive song. For example, the interactive media player 202b renders the interactive song with only the "segment" control 501, or only the "beat" control 502, or only the "melody" control 503 on the interface 202f displayed on the second user's computing device 201. The interactive media player 202b also renders the interactive song with the "segment" control 501 and the "beat" control 502 to the second user or any subsequent user. The interactive media player 202b also renders the interactive song with the "segment" control 501, the "beat" control 502, and/or the "melody" control 503 to the second user or any subsequent user. The second user and any subsequent user can therefore modify the same interactive song in different ways.

Figure 6:
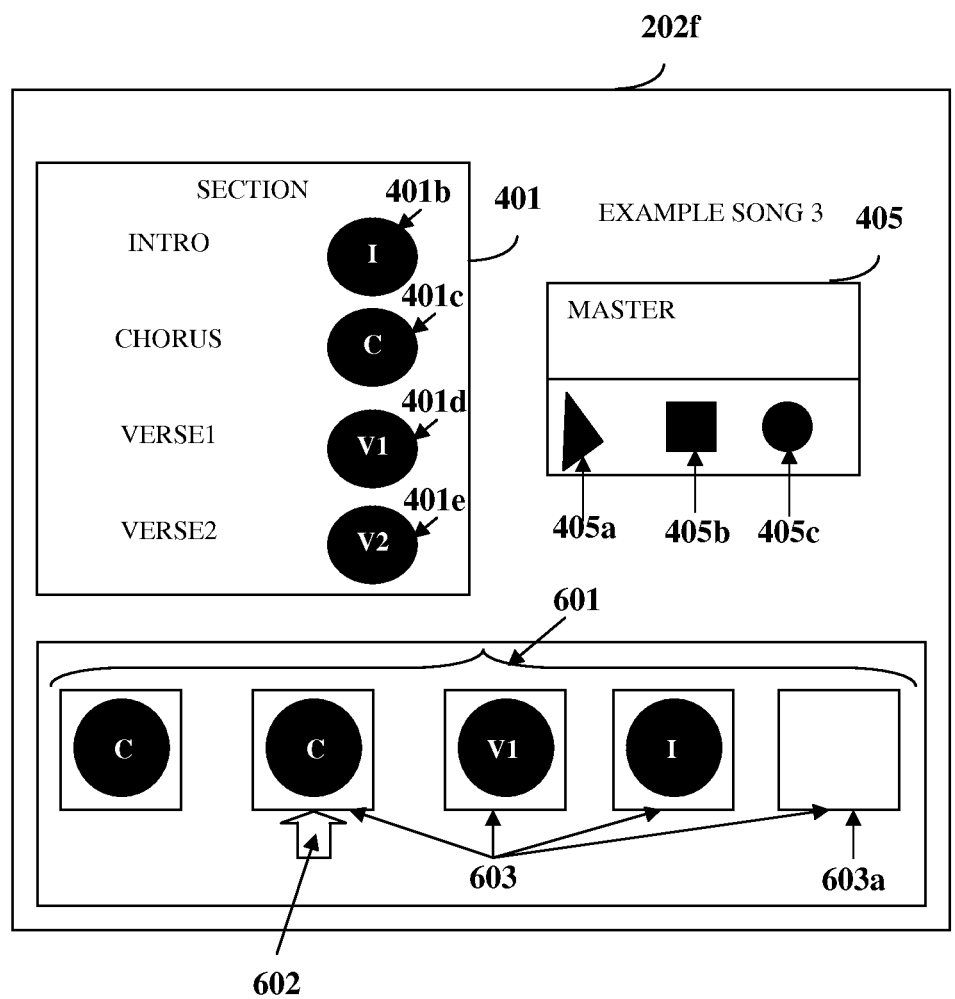
FIG. 6 exemplarily illustrates an interface for a sample piece of multimedia content named "Example Song 3".

FIG. 6 exemplarily illustrates an interface 202f for a sample piece of multimedia content named "Example Song 3". The interface 202f, exemplarily illustrated in FIG. 6, displays a timeline 601, a play position indicator 602, a "section" control 401, and a "master" group of controls 405. The "section" control 401 is a set of controls enabling the second user to select parameters, for example, "intro", "chorus", "verse1", or "verse2" corresponding to the icons "I" 401b, "C" 401c, "V1" 401d, and "V2" 401e respectively. In this case, the "section" control 401 provides a different set of options. In an embodiment, the second user may have to continually manipulate one or more controls of the interface 202f in order to hear the playback of the multimedia content. In this embodiment, the second user is required to populate the timeline 601 comprising, for example, a series of blocks 603 initially empty by dragging the icons 401b, 401c, 401d, and/or 401e into the series of blocks 603. The multimedia content plays back and the play position indicator 602 indicates one of the blocks 603 that is currently playing on the interface 202f. If the second user does not select a block 603 or leaves a block 603a empty, when the play position indicator 602 reaches the empty block 603a, the multimedia content pauses or stops playing the multimedia content. The "master" group of controls 405 allows the second user to control start 405a of the playback of the multimedia content, stop 405b of the playback of the multimedia content, and to record 405c the presets.

In an embodiment, the defined controls with the multimedia content is rendered to the second user on the interface 202f in a three dimensional (3D) interactive environment similar to the interface of, for example, a computer game. The second user moves about in the three dimensional interactive environment and interacts with the defined controls that appear as physical objects situated throughout the three dimensional interactive environment. The interactive media engine 202c in the three dimensional interactive environment renders the same functionality as the interactive media engine 202c would in a two-dimensional (2D) environment to play back the interactive multimedia content, as the interactive media engine data transmitted by the interface 202f in the three dimensional interactive environment is more or less the same as the interactive media engine data transmitted by the interface 202f in the two-dimensional interactive environment. The interface 202f is configured to display the three dimensional interactive environment and acquires the interactive media player data for interactive multimedia content with three dimensional interfaces in the three dimensional interactive environment. Furthermore, the interactive media player data in the three dimensional interactive environment comprises information on playing back the interactive multimedia content in the three dimensional interactive environment.

In another embodiment, the controls defined by the first user permit the second user to modify a predetermined set of variables of the multimedia content. For example, the interface 202f only allows the second user to make modifications to the interactive multimedia content, for example, interactive songs that affect a whole song globally. For example, consider the second user is presented with the interface 202f exemplarily illustrated in FIG. 4. In this embodiment, the "section" control 401 is not presented to the second user or is disabled because changing to a different section of the song is not a change that affects the whole song. The second user is allowed to manipulate the "style" control 402 and the "parts" group of controls 403, as the "style" control 402 and the "parts" group of controls 403 change the multimedia content arrangement and therefore change the whole interactive multimedia content. In this example, the second user can make changes to the defined controls at any time such as the time when the multimedia content is being played and the time when the multimedia content is not being played and can store the positions of the defined controls as the new preset data. When the multimedia content is played back in accordance with the new preset, the effects of the defined controls are heard throughout the song. Consider an example where the second user sets a control to play a song with the vocals turned off and saves the song with the vocals turned off as a new preset. In this example, when the second user or any other subsequent user chooses to playback the new preset, the song is played back with the vocals turned off throughout the entire song.

Figure 7:
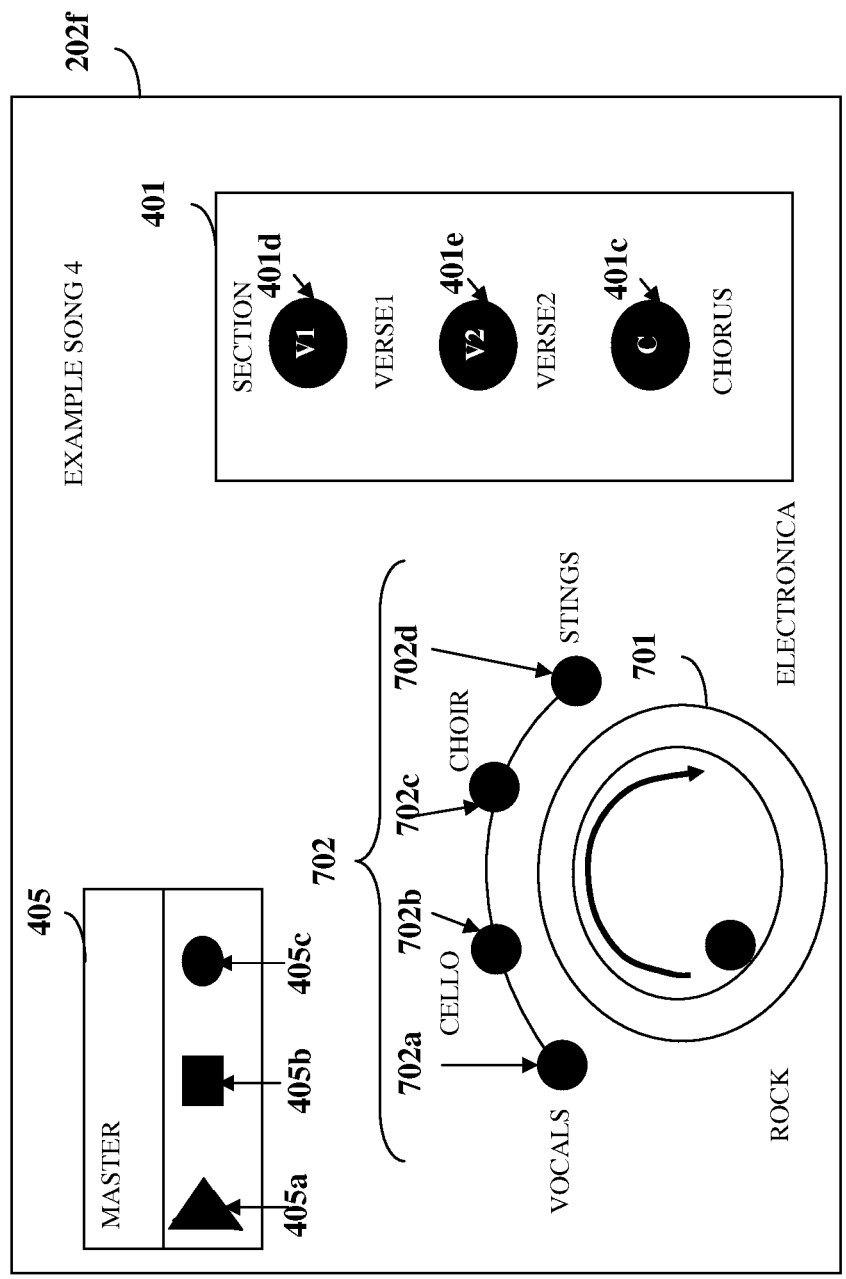
FIG. 7 exemplarily illustrates an interface for controlling playback of a sample piece of multimedia content named "Example Song 4".

FIG. 7 exemplarily illustrates an interface 202f for controlling playback of a sample piece of multimedia content named "Example Song 4". The computer implemented method and system 200 disclosed herein presents different interfaces 202f to the second user for different interactive songs. The interface 202f exemplarily illustrated in FIG. 7 presents a graphical representation of controls defined by the first user and allows the second user and any subsequent user to explore and modify multiple variables of the interactive song named "Example Song 4" to create their own personalized versions of the interactive song. The interface 202f comprises a "master" group of controls 405, a "transition" control 701, a "section" control 401, and a set of controls 702 for switching on the "vocal" 702a part of the interactive song, switching to a "cello" 702b part of the interactive song, playing a short "choir" 702c part of the interactive song, or playing a "stings"

702d part of the interactive song. The "transition" control 701 allows the second user to transition between a rock and an electronic arrangement of the interactive song. The second user can also acquire a short choir 702c of the interactive song, change to a verse 401d or 401e or chorus 401c of the interactive song, add the cello part 702b to the base part of the interactive song, play a stings phrase 702d over the top of the interactive song, play the "vocal" 702a part of the interactive song, etc. When the second user provides control inputs to select values for the defined parameters associated with the defined controls, the interactive media application 202 modifies the variables of the interactive song only when musically appropriate, without requiring the second user to select timing. The "master" group of controls 405 allows the second user to control start 405a of the playback of the multimedia content, stop 405b of the playback of the multimedia content, and to record 405c the presets.

Figure 8:
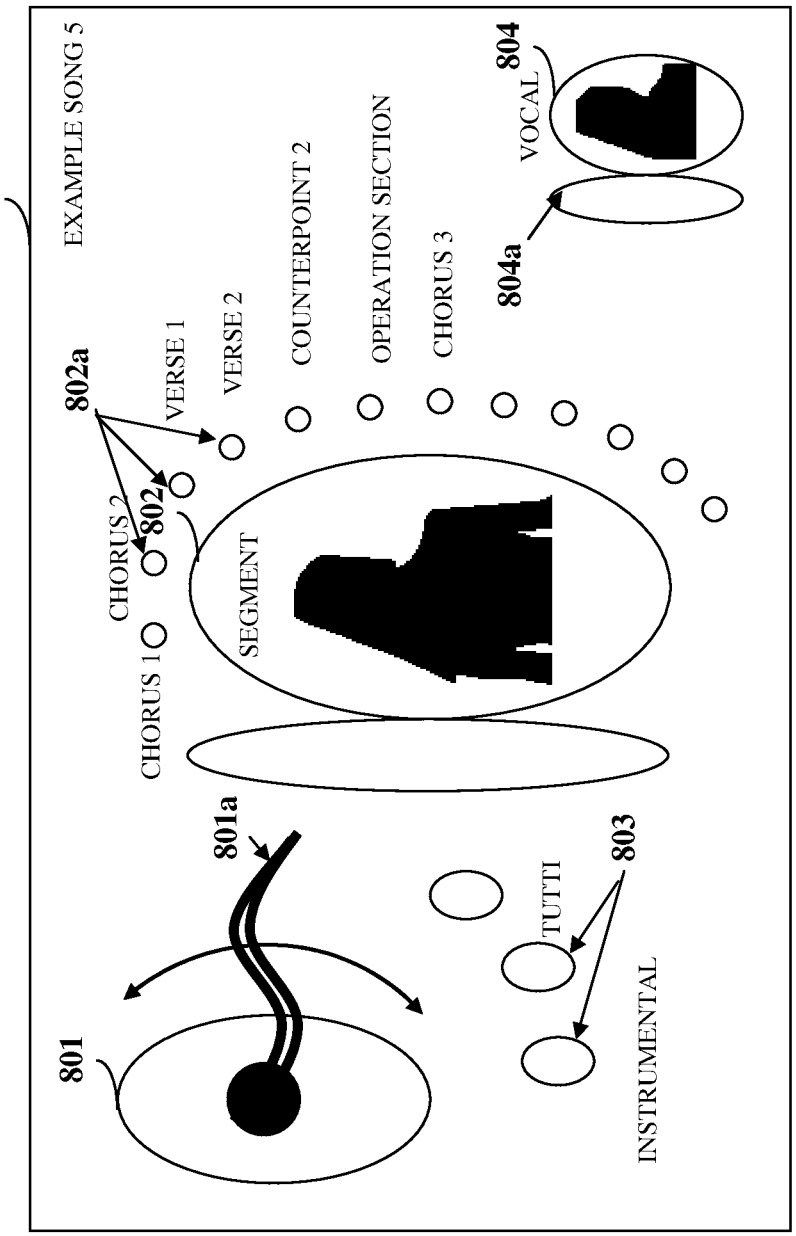
FIG. 8 exemplarily illustrates an interface for controlling playback of a sample piece of multimedia content named "Example Song 5".

FIG. 8 exemplarily illustrates an interface 202f for controlling playback of a sample piece of multimedia content named "Example Song 5". This interface 202f provides different graphical representations of a different set of controls defined by the first user and allows the second user to explore and modify multiple variables of another interactive song. The interface 202f exemplarily illustrated in FIG. 8 comprises a "balance" control 801 graphically represented as a lever handle 801a, a "segment" set of controls 802 graphically represented as spherical objects 802a, and a "vocal" control 804 graphically represented as a decorative locket 804a. The second user can switch to an instrumental version of the interactive song by selecting one of the spherical objects 803 on the interface 202f. The second user can choose a balance between orchestra instruments and contemporary instruments of the interactive song by moving the lever handle 801a that graphically represents the "balance" control 801 on the interface 202f. The second user can traverse between different segments, for example, verses, choruses, of the interactive song by selecting corresponding spherical objects 802a that graphically represent the "segment" set of controls 802 on the interface 202f. The second user can also play a short improvised vocal path by one of the artist's vocalists by opening the decorative locket 804a that graphically represents the "vocal" control 804. The second user can provide other control inputs to playback a randomly different improvised vocal path. The second user can therefore continuously modify the variables of the interactive song for controlling the playback of the interactive song in real time and for creating personalized versions of the interactive song. The personalized versions of the interactive song can be saved, played back by the second user, and shared with a subsequent user using, for example, social networking platforms.

Figure 9A:
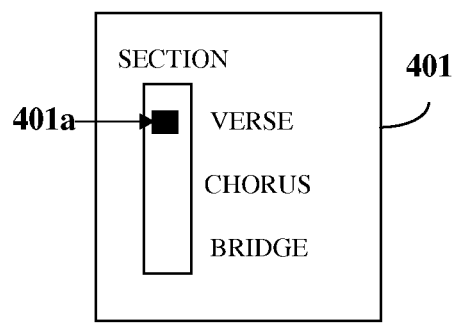
FIG. 9A exemplarily illustrates a "section" control with a toggle switch in a high position.
Figure 9B:
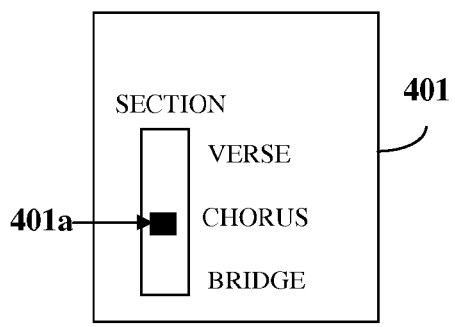
FIG. 9B exemplarily illustrates the "section" control with the toggle switch in a middle position.
Figure 9C:
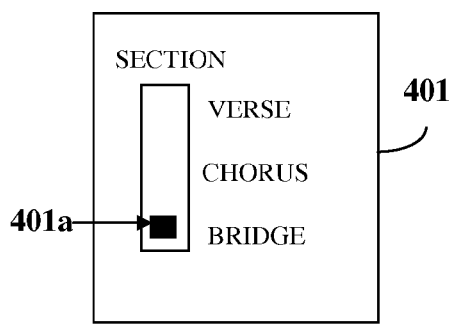
FIG. 9C exemplarily illustrates the "section" control with the toggle switch in a low position.

FIGS. 9A-9C exemplarily illustrate three different positions of the "section" control 401 graphically represented by a toggle switch 401a. Each of the three positions is configured in the interactive media player authoring tool 202a. If the second user positions the three way toggle switch 401a in a high position, the interactive media player 202b displays a graphical representation of the "section" control 401 as exemplarily illustrated in FIG. 9A to the second user on the interface 202f. The interactive media player 202b transmits message to the interactive media engine 202c stating that the "section" control 401 has been set to the value "verse". If the second user positions the three way toggle switch 401a in a middle position, the interactive media player 202b displays a graphical representation of the "section" control 401 as exemplarily illustrated in FIG. 9B to the second user via the interface 202f. The interactive media player 202b transmits a message to the interactive media engine 202c for updating the value of the "section" control 401 to "chorus". If the second user positions the three way toggle switch 401a in a low position, the interactive media player 202b displays a graphical representation of the "section" control 401 as exemplarily illustrated in FIG. 9C to the second user via the interface 202f and the interactive media player 202b transmits a message to the interactive media engine 202c for updating the value of the "section" control 401 to "bridge". The interactive media player authoring tool 202a is used for defining parameters and for setting values for the defined parameters. In an embodiment, the control inputs provide a selection of values for the defined parameters and the interactive media player 202b reports the selection to the interactive media engine 202c, in real time during playback of the multimedia content.

The interactive media player 202b saves one or more graphic files associated with the graphical representation of the controls as interactive media player data in the interactive media player data file or saves the locations of the graphic files in the interactive media player data file. In an embodiment, the interactive media player 202b also saves the locations of the graphic files as a component of the interactive media player data. Further, all states of all the defined controls, except the "master" group of controls 405 and the "presets" drop down list 404, are associated with values of the defined parameters. Each of the defined parameters and the state of each of the defined parameters are named such that the interactive media player data file and the interactive media engine data file refer to the same names. The interactive media player data refers to the defined parameters and comprises information regarding the variables to be modified corresponding to the selection of values of the defined parameters and the mode of modifying the variables. For example, consider the second user is presented with the interface 202f exemplarily illustrated in FIG. 4. Positioning the "style" control 402 in an extreme right position increases a value of the "Electronica" parameter. Increasing the value of "Electronica" parameter causes an "Electronic Volume" variable to increase and causes a "Rock Volume" variable to decrease. The interactive media engine 202c renders an audio file "electronic.wav" with greater volume and an audio file "rock.wav" with less volume to the second user.

In an embodiment, the computer implemented method and system 200 disclosed herein allows the first user to replace digital audio files with the digital video files or allows the first user to add digital video files to the digital audio files to create multimedia content. In this embodiment, the interactive media player 202b allows the second user and any subsequent user to interactively change the music or video in the multimedia content or interactively sequence one or more multimedia clips, for example, a video clip, an audio clip, etc. to form new multimedia content.

Figure 10:
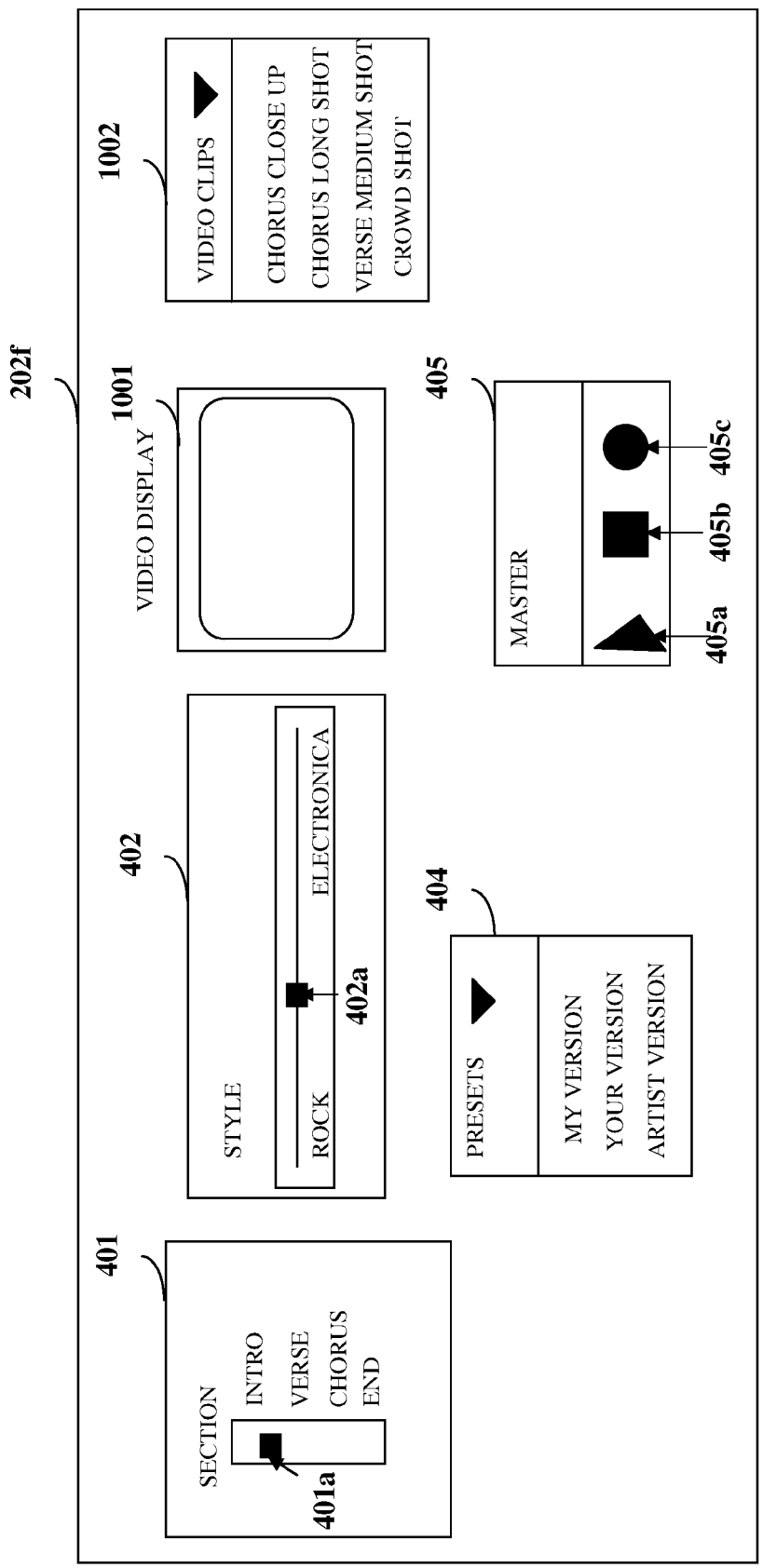
FIG. 10 exemplarily illustrates an interface for an interactive music video clip.

FIG. 10 exemplarily illustrates an interface 202f for an interactive music video clip. The interface 202f displays a "section" control 401, a "style" control 402, a "presets" drop down list 404, a "master" group of controls 405, a video display 1001, and a "video clips" drop down list 1002. The "section" control 401 provides a four-way toggle switch 401a for selecting musical sections defined by the parameters "intro", "verse", "chorus" and "end". The "style" control 402 provides a continuous controller 402a for transitioning the genre music from "rock" at the extreme left hand position to "electronica" at the extreme right hand position. The "presets" drop down list 404 allows the second user to recall previously recorded interactions with the graphical representation of the defined controls. In the interface 202f exemplarily illustrated in FIG. 8, the "my version", "your version", and "artist version" represent the three previously recorded interactions and constitute the "presets" drop down list 404. The "master" group of controls 405 allows the second user to control start 405a of the playback of the multimedia content, stop 405b of the playback of the multimedia content, and to record 405c the presets. The video display 1001 renders a video clip to the second user. The "video clips" drop down list 1002 provides a list of video clips that may be selected to play in the video display 1001. In an embodiment, the interactive media engine 202c synchronizes the video clips automatically to the music.

Figure 11:
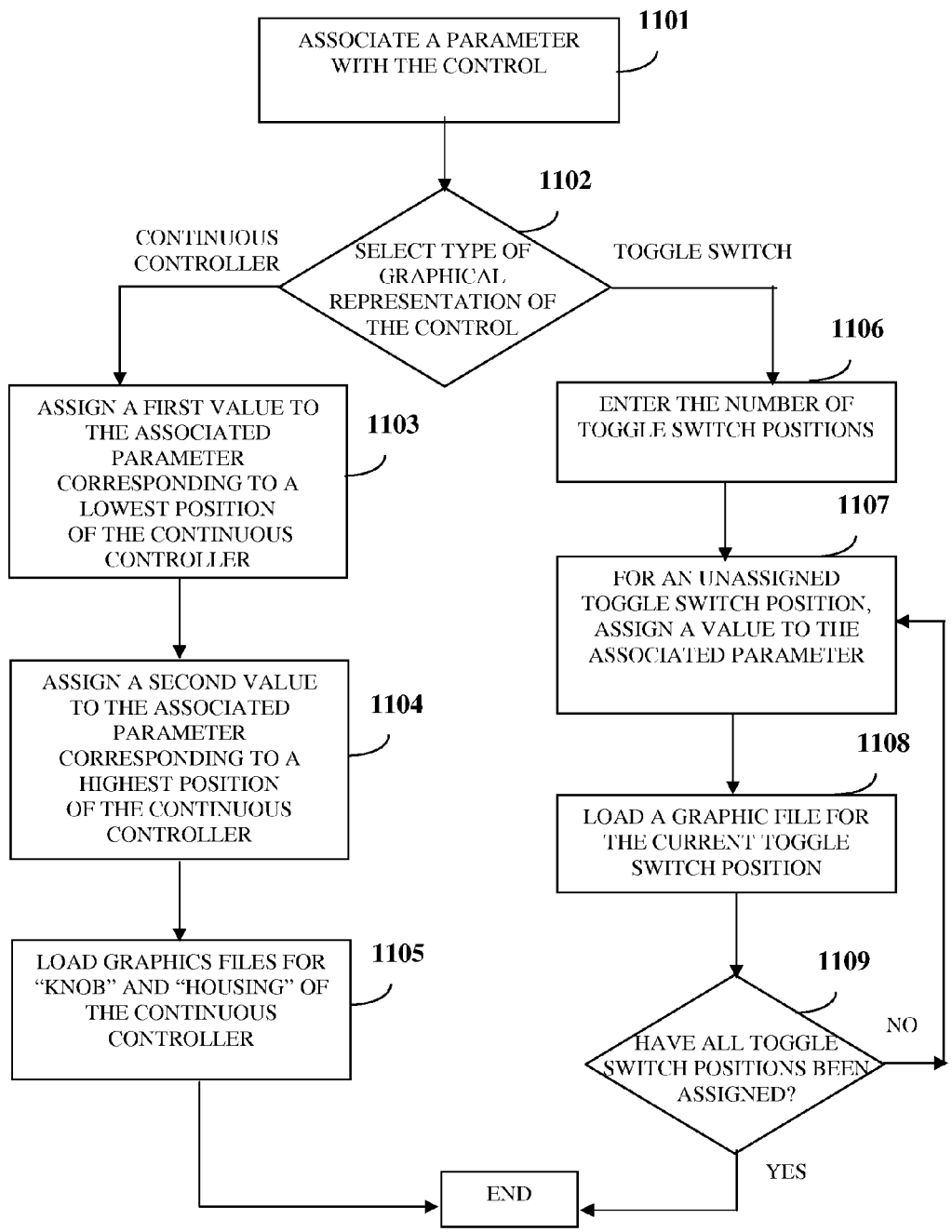
FIG. 11 exemplarily illustrates a flowchart comprising the steps of defining and configuring a single control for a piece of multimedia content.

FIG. 11 exemplarily illustrates a flowchart comprising the steps of defining and configuring a single control for a piece of multimedia content. In this example, a graphical representation of the single control is a toggle switch, for example, 401a illustrated in FIG. 4 or a continuous controller, for example, 402a illustrated in FIG. 4. A first user, for example, an artist, defines or configures the single control to cause a control input provided by a second user to change the value of a variable in the interactive media engine 202c for influencing the playback of the multimedia content. The first user associates 1101a parameter with the control using the interactive media player authoring tool 202a. The first user then selects 1102 the type of graphical representation of the control, for example, a continuous controller 402a or a toggle switch 401a. If the first user selects the continuous controller 402a, the first user assigns 1103 a first value to the associated parameter corresponding to a lowest position of the continuous controller 402a using the interactive media player authoring tool 202a. The first user then assigns 1104 a second value to the associated parameter corresponding to a highest position of the continuous controller 402a using the interactive media player authoring tool 202a.

When the first user slides between the lowest position of the continuous controller 402a and the highest position of the continuous controller 402a, the interactive media player 202b interpolates between the assigned first value and the assigned second value for obtaining interpolated values at different positions of the continuous controller 402a. The interactive media player 202b then transmits the obtained interpolated values to the interactive media engine 202c at each of the different positions. Following assigning the second value to the parameter, the first user loads 1105 multiple graphic files for creating a graphical representation of the defined control on the interface 202f for each piece of the multimedia content. For example, the first user loads the graphic files for the "knob" and the "housing" of the continuous controller 402a. This allows the artist to give the interface 202f a specific appearance, so that the appearance of the interface 202f can also be varied from one piece of multimedia content to another piece of multimedia content. In an embodiment, the first user loads a background graphic for the entire interface 202f.

If the first user selects 1102 a toggle switch 401a, the first user enters 1106 a number of toggle switch positions. For example, for the "section" control 401 exemplarily illustrated in FIG. 4 and FIGS. 9A-9C, the first user enters three toggle switch positions. The first user assigns 1107 a value to the associated parameter for each of the toggle switch positions. The assigned value is a number or a string indicating, for example, "verse", "chorus", "bridge", etc. In an embodiment, the first user selects the value from a set of available values. The first user then loads 1108 a graphic file for each of the toggle switch positions and associates each assigned value with one graphic file. The first user repeats the association of each assigned value and each graphic file for each of the toggle switch positions. The first user checks 1109 whether all the toggle switch positions have been assigned. If not, the first user assigns 1107 a value for the associated parameter for each unassigned toggle switch position and loads 1108 a graphic file for the current toggle switch position.

Figure 12:
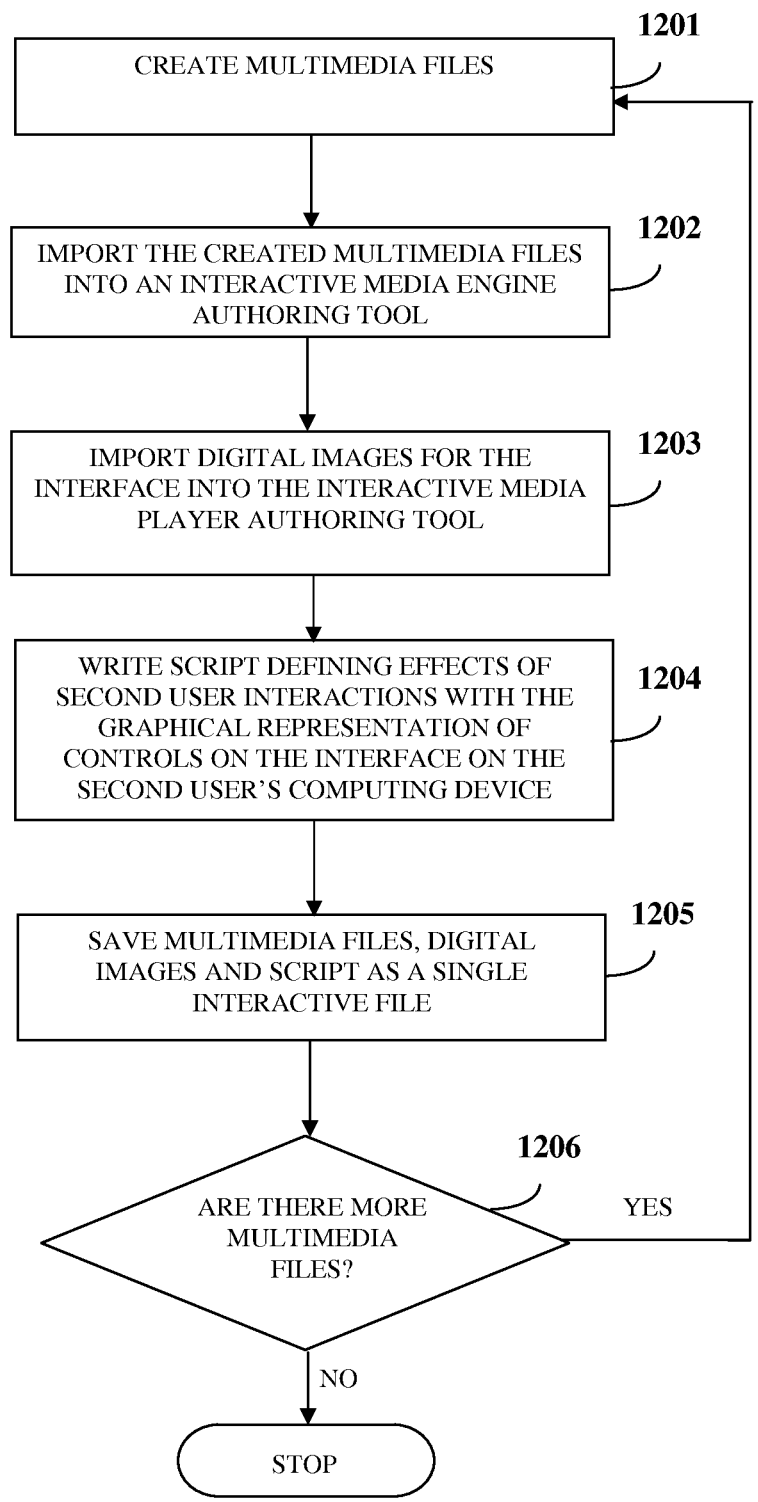
FIG. 12 exemplarily illustrates a flowchart comprising the steps of creating multimedia content by an artist.

FIG. 12 exemplarily illustrates a flowchart comprising the steps of creating multimedia content by an artist also referred to as the first user. The created multimedia content allows a second user to interact with the interactive media player 202b for influencing playback of the created multimedia content. To create the multimedia content for playback on the interactive media player 202b, the artist authoring the multimedia content uses the interactive media player authoring tool 202a and the interactive media engine authoring tool 202d. The artist creates 1201 the multimedia files comprising, for example, digital audio files, digital video files, text files, etc. using existing recording equipment, musical instruments, audio production software, video cameras, editing and animation software, etc. The artist also provides instructions on how the multimedia files should be played in relation to each other. The artist then imports 1202 the created multimedia files into the interactive media engine authoring tool 202d. The created multimedia files are interrelated such that they are played simultaneously or sequentially in various combinations to form the multimedia content. The artist then imports 1203 one or more digital images into the interactive media player authoring tool 202a for designing an interface 202f associated with the multimedia content. The artist defines one or more controls. The artist defines one or more parameters and associates the defined parameters with the defined controls using the interactive media player authoring tool 202a. The defined parameters are the attributes of the defined controls within the multimedia content displayed to the second user via the graphical representation on the interface 202f.

The artist then writes 1204 scripts defining effects of second user interactions with the graphical representation of the defined controls on the interface 202f on the second user's computing device 201. Any interaction with the graphical representation of the defined controls correspondingly selects values for the defined parameters. The interactive media engine 202c executes one or more of the defined controls based on the selection of the values. The execution in turn modifies one or more variables sent to the interactive media engine 202c for influencing playback of the multimedia content. In an embodiment, the interactive media engine authoring tool 202d allows the artist to import the multimedia files, for example, digital audio files. The artist sets up rules for the interactive media engine 202c to react with changes in values of the defined parameters selected external to the interactive media engine 202c. The rules involve starting and stopping playback of the individual digital audio files and/or setting certain audio processing tasks to occur at a certain time or over a certain period of time. For example, if an externally controlled "section" control 401 has its value set to "chorus", a rule exists to start playing the audio files "chorus_bass.wav" and "chorus_drums.wav" at the beginning of the next measure, to fade out a "guitar_solo.wav" audio file if playing, over three beats, and to simultaneously fade in the "chorus_melody.wav" audio file over three beats.

Consider an example where the artist writes an interactive song named "Hello World" and records the following digital audio files:
Chorus_bass.wav
Chorus_drums.wav
Chorus_guitar.wav
Verse_bass.wav
Verse_drums.wav
Verse_guitar.wav The file names starting with the word "Chorus" herein referred to as "Chorus files" are played simultaneously and the file names starting with the word "Verse" herein referred to as "Verse files" are played simultaneously. However, a Chorus file and a Verse file are not played simultaneously as playing the Chorus file and the Verse file simultaneously produces an effect not intended by the artist. A Chorus file is allowed to sequentially follow a Verse file and vice versa. The instructions for playing the digital audio files herein referred to as "playback instructions" are based on the rules set up by the artist. The playback instructions are instructions for the interactive media engine 202c.

In an embodiment, the interactive media player authoring tool 202a allows the artist to import the "Hello World" digital audio files and define the playback instructions. The artist writes the playback instructions using a scripting language, for example, JavaScript, Tool command language (Tcl), a new language created exclusively for the interactive media player authoring tool 202a, etc. The interactive media player authoring tool 202a interprets the scripting language. Additionally, the artist takes into account the real time input from the second user while writing the playback instructions. At the time of playback of the multimedia content, the second user may interact with a certain graphical representation of a defined control rendered on the interface 202f in order to change the way the interactive song is played back. Therefore, the artist provides the following playback instructions for the "Hello World" song:

If (user_input="Chorus") then {
Play(Chorus_bass.wav);
Play(Chorus_drums.wav);
Play(Chorus_guitar.wav);
}
If (user_input="Verse") then {
Play(Verse_bass.wav);
Play(Verse_drums.wav);
Play(Verse_guitar.wav);
}

In addition to writing the playback instructions, the artist also creates the graphical representation of the defined controls. The artist creates digital images for the graphical representation of the defined controls using existing graphic production tools and software or uses previously created digital images. In an embodiment, the artist imports the digital images of buttons, toggle switches 401a, rotary dials 501a, etc. into the interactive media player authoring tool 202a.

Figure 13:
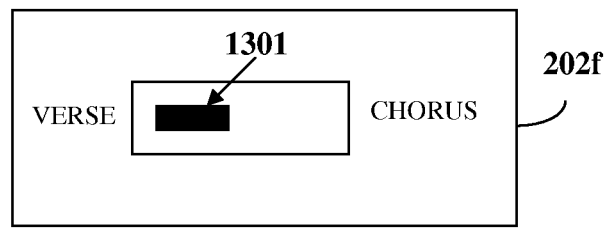
FIG. 13 exemplarily illustrates an interface for a sample piece of multimedia content.

FIG. 13 exemplarily illustrates an interface 202f for a sample piece of multimedia content. The sample piece of multimedia content is herein referred to as the "Hello World" song. The interface 202f for the "Hello World" song comprises a two way toggle switch 1301 with one position named "Verse" and the other named "Chorus" as exemplarily illustrated in FIG. 13. For this graphical representation, a pair of digital images is imported into the interactive media player authoring tool 202a. Each of the imported digital images displays a different position of the toggle switch 1301 to the second user.

The interactive media player authoring tool 202a allows the artist to set up the interface 202f for translating a click on the toggle switch 1301 to a change in the display of the toggle switch 1301 from a current image to another image, thereby appearing to change the toggle switch 1301 from selecting "Chorus" to selecting "Verse" or vice versa. Furthermore, the interactive media player authoring tool 202a allows the artist to set up the interface 202f for translating a click on the toggle switch 1301 to inform the interactive media engine 202c that the second user input has changed from "Verse" to "Chorus" or vice versa. This is performed according to the example script above, where the artist would set one position of the toggle switch 1301 so that the second user input value becomes "Chorus" and set the other position of the toggle switch 1301 so the second user input value becomes "Verse". The artist saves 1205 the multimedia files, the digital images, and the written script as a single interactive data file. In an embodiment, the artist uses the interactive media player authoring tool 202a for saving the single interactive data file. In the above mentioned example, the artist uses the interactive media player authoring tool 202a to save the digital audio files, the playback instructions and the digital images relating to the "Hello World" song into a single interactive digital data file named "HelloWorld.imf". Similarly, the artist adds other digital audio files and creates a graphical representation for other defined controls for the multimedia content. Once completed, the interactive digital data file, for example, "HelloWorld.imf", is rendered to the second user for playback. If there are more multimedia files 1206, the steps 1201, 1202, 1203, 1204, and 1205 are repeated for each multimedia file.

In the above example, the second user is presented with a toggle switch 1301 control where the two positions are labeled "verse" and "chorus" as exemplarily illustrated in FIG. 13. If the second user switches to the "verse" position, the files "Verse_bass.wav", "Verse_drums.wav", and "Verse_guitar.wav" are played. If the second user switches to the "chorus" position, the files "Chorus_bass.wav", "Chorus_drums.wav", and "Chorus_guitar.wav" are played.

The interactive media engine authoring tool 202d provides the artist with the ability to create or update the interactive media engine data. During execution, the interactive media engine 202c reads the interactive media engine data for obtaining instructions to change the playback of the multimedia content according to changes in externally updated variables. Consider, for example, making a musically pleasing transition from a verse to a chorus when the second user selects "chorus" in the "section" control 401 as exemplarily illustrated in FIG. 4. The interactive media player 202b receives input from the second user and converts the received input into one or more messages for transmitting to the interactive media engine 202c. Following transmission of the messages to the interactive media engine 202c, the interactive media engine 202c updates the values of the variables in the interactive media engine data to modify the variables of the multimedia content. The transmitted messages depend on mappings set up in the interactive media player authoring tool 202a. The mappings set up in the interactive media player authoring tool 202a map all the possible changes to states of the defined controls caused by the interactions with the graphical representations of the defined controls to changes in values of the parameters that the interactive media engine 202c reacts to for modifying the variables.

Figure 14:
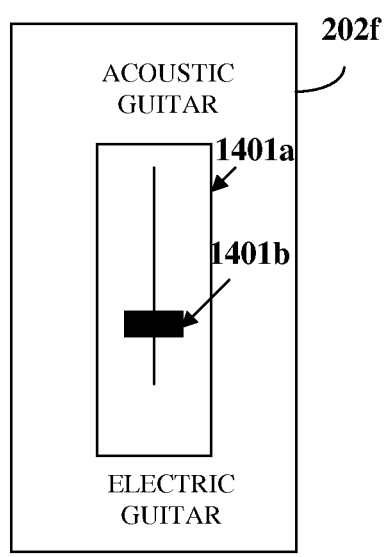
FIG. 14 exemplarily illustrates an interface for a sample piece of multimedia content.

FIG. 14 exemplarily illustrates an interface 202f for a sample piece of multimedia content herein referred to as a "Hello Mars" song. The graphical representation of the controls defined for the "Hello Mars" song is similar in appearance to the graphical representation of the controls defined for the "Hello World" song exemplarily illustrated in FIG. 13, but behaves in a fundamentally different way. The interface 202f of the "Hello Mars" song comprises a slidable control 1401 with two extreme positions namely "Acoustic Guitar" and "Electric Guitar". At a first extreme position, a guitar part of the song is rendered to the second user as an acoustic guitar and at a second extreme position the guitar part of the song is rendered as an electric guitar. In a position between the first extreme position and the second extreme position, the guitar part of the song is heard as a balance between the acoustic guitar and the electric guitar. The pseudocode for defining the controls for the "Hello Mars" song is, for example:
// get the current position of the slider set by the second user as a value between 0 and 1 guitar_balance=getInput(Guitar-Slider);
// change the volume that the acoustic guitar audio file is played at to be the same as the guitar_balance, so the volume of the acoustic guitar goes up as the GuitarSlider goes up
SetVolume(Acoustic_gtr.wav, guitar_balance);
// change the volume that the electric guitar audio file is played at to be the inverse of the guitar_balance, so the volume of the electric guitar goes down as the GuitarSlider goes up.
SetVolume(Electric_gtr.wav, 1-guitar_balance);

To create a graphical user interface 202f for the Guitar-Slider control, the artist creates separate graphics for the housing 1401a of the slider and for the knob 1401b of the slider. Clicking and dragging the knob 1401b up and down within the slider housing 1401a by the second user causes the position of the knob 1401b, relative to the length of the housing 1401a, to be reported as a value between 0 and 1 to the interactive media engine 202c. In this example, similar to the "HelloWorld" song disclosed in the detailed description of FIG. 13, all the digital audio files, playback instructions, and digital images relating to the "HelloMars" song are saved to a single interactive data file named "HelloMars.imf". The second user opens the "HelloMars.imf" and the interface 202f exemplarily illustrated in FIG. 14 is rendered to the second user on the computing device 201.

Figure 15:
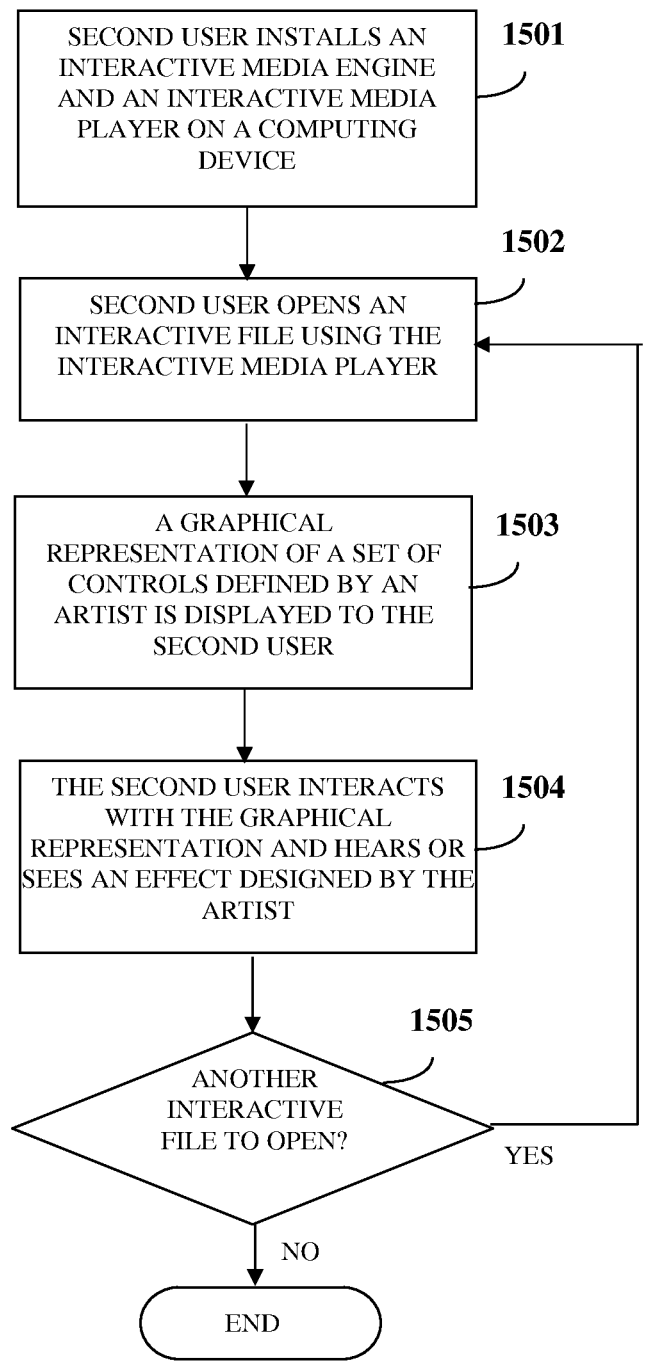
FIG. 15 exemplarily illustrates a flowchart comprising the steps of controlling playback of multimedia content using an interactive media application.

FIG. 15 exemplarily illustrates a flowchart comprising the steps of controlling playback of multimedia content using the interactive media application 202. For playing back the multimedia content, a second user installs 1501 the interactive media engine 202c and the interactive media player 202b of the interactive media application 202 exemplarily illustrated in FIG. 2 on a computing device 201. In an embodiment, the second user also installs the interactive media player authoring tool 202a in addition to the interactive media engine 202c and the interactive media player 202b on the computing device 201. The second user opens 1502 an interactive file associated with the multimedia content using the installed interactive media player 202b. The interactive media player 202b displays 1503 an interface 202f comprising a graphical representation of each of the controls defined by an artist authoring the multimedia content, on the second user's computing device 201. The second user interacts 1504 with the graphical representation of the defined controls for providing one or more control inputs via the interface 202f of the second user's computing device 201 and hears or sees effects designed by the artist on the multimedia content. If there is another interactive file to open 1505, the second user opens 1502 another interactive file using the interactive media player 202b and the steps 1503 and 1504 are repeated for controlling the playback of the multimedia content in the interactive files.

Consider another example where the second user opens the "HelloWorld.imf" file disclosed in the detailed description of FIG. 13. The second user is presented with a two way toggle switch 1301 control. The two extreme positions of the toggle switch 1301 are labeled or named "verse" and "chorus." The second user changes the positions of the toggle switch 1301 for providing the control inputs to the interactive media player 202b. The second user switches to the "verse" position causing the "Verse" music to be played by rendering the files "Verse_bass.wav", "Verse_drums.wav" and "Verse_guitar.wav" to the second user. The second user switches to the "chorus" position causing the "Chorus" music to be played by rendering the files "Chorus_bass.wav", "Chorus_drums.wav" and "Chorus_guitar.wav" to the second user.

Similarly, if the second user opens the "HelloMars.imf", the second user sees the GuitarSlider control comprising the housing 1401a and the knob 1401b as exemplarily illustrated in FIG. 14. When the second user moves the knob 1401b of the GuitarSlider control up and down, the balance of the acoustic guitar and the electric guitar is changed.

The interactive media application 202 for controlling playback of multimedia content in real time may also be implemented on operating systems for mobile devices, for example, Windows Mobile®, Symbian, Google™ Android, or Apple® iPhone. Mobile implementation uses similar algorithms but may involve different hardware interfaces. For example, the second user may provide the control inputs for selecting values for the defined parameters associated with the defined controls via a touch screen or via voice recognition, and messages may be created using an on-screen keypad or slide-out keyboard, communicating with client software on the mobile device or in a mobile browser. Message transmission then occurs using the mobile device's internet capabilities via a network 203, for example, a WiFi network, a satellite network, a cellular network, etc. The interactive media application 202 may also be implemented on two different devices, for example, a desktop and a mobile device, to facilitate communication between them.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, processor cache, a random access memory (RAM), etc. Transmission media comprise, for example, coaxial cables, copper wire and fiber optics, including the wires that constitute a system bus coupled to a processor. Common forms of computer readable media comprise, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device, and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Thus, embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as an object code. The computer program product disclosed herein comprises computer executable instructions embodied in a non-transitory computer readable storage medium, wherein the computer program product comprises computer program codes for implementing the processes of various embodiments.

Where databases are described such as the database 202e, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein Likewise, object methods or behaviors of a database can be used to implement various processes, such as those disclosed herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method for controlling playback of multimedia content in real time, comprising:
   providing a computer system comprising at least one processor, said computer system communicatively coupled to a non-transitory computer readable storage medium configured to store instructions executable by said at least one processor, said at least one processor configured to implement said method, said method comprising:
      providing an interactive media application executable by said at least one processor for playing back said multimedia content;
      defining one or more of a plurality of controls for said multimedia content by a first user and defining parameters associated with said defined one or more controls by said first user using said interactive media application;
      rendering a graphical representation of said defined one or more controls with said multimedia content on an interface displayed on a computing device of a second user by said interactive media application;
      acquiring one or more control inputs from said second user by said interactive media application, wherein said one or more control inputs acquired from said second user provide a selection of values for said defined parameters associated with said defined one or more controls;
      generating a plurality of data files by associating said acquired one or more control inputs, and said selection of values for said defined parameters associated with said defined one or more controls by said interactive media application, comprising:
         a first data file comprising data related to one or more playback patterns of said multimedia content;
         a second data file comprising data related to said defined one or more controls, said defined parameters associated with said defined one or more controls, information regarding said one or more variables of said multimedia content to be modified corresponding to said defined parameters, and modes of modifying said one or more variables of said multimedia content; and
         a third data file comprising data related to locations of digital files constituting said multimedia content, said multimedia content, names of said one or more variables of said multimedia content, information pertaining to time, duration, start time, and end time of said multimedia content;
      executing said generated plurality of files on said at least one processor, wherein said execution defines one or more controls based on said selected values of said defined parameters for modifying one or more variables of said multimedia content by said interactive media application;
      rendering said multimedia content in accordance with said modified one or more variables on said interface displayed on said computing device of said second user by said interactive media application; and
      invoking an instance of said interactive media application on said computing device of said second user for controlling playback of one or more pieces of said multimedia content;
   whereby said modification of said one or more variables of said multimedia content controls said playback of said multimedia content.

2. The computer implemented method of claim 1, wherein said interactive media application enables continuous modification of said one or more variables of said multimedia content by acquiring said control inputs from said second user for controlling said playback of said multimedia content in said real time.

3. The computer implemented method of claim 1, wherein said defined controls permit said second user to modify a predetermined set of variables of the multimedia content, and wherein said interactive media application renders said multimedia content in accordance with said modified variables on said interface displayed on said computing device, and wherein said modification of said variables of said multimedia content controls said playback of said multimedia content.

4. The computer implemented method of claim 1, wherein said graphical representation of said defined one or more controls is one or more of a toggle switch, a slidable control, a tactile control, and a clickable control.

5. The computer implemented method of claim 1, wherein said graphical representation of said defined one or more controls with said multimedia content is rendered on said interface displayed on said computing device of said second user in a three dimensional interactive environment by said interactive media application for enabling said control of said playback of said multimedia content.

6. The computer implemented method of claim 1, wherein said second user provides said control inputs to said interactive media application via a plurality of input modes.

7. A computer implemented system for controlling playback of multimedia content in real time, comprising:
   an interactive media application configured to play back said multimedia content comprising:
      an interactive media player authoring tool configured to enable a first user to define one or more of a plurality of controls for said multimedia content and to define parameters associated with said defined one or more controls;
      an interactive media player configured to render a graphical representation of said defined one or more controls with said multimedia content on an interface displayed on a computing device of a second user;
      said interactive media player configured to acquire one or more control inputs from said second user, wherein said one or more control inputs acquired from said second user provide a selection of values for said defined parameters associated with said defined one or more controls;
      said interactive media player configured to generate a first data file comprising data related to one or more playback patterns of said multimedia content, wherein said interactive media player records said one or more playback patterns of said multimedia content on said first data file;
      said interactive media player authoring tool configured to generate a plurality of data files, comprising:
         a second data file comprising data related to said defined one or more controls, said defined parameters associated with said defined one or more controls, information regarding said one or more variables of said multimedia content to be modified corresponding to said defined parameters, and modes of modifying said one or more variables of said multimedia content;
         a third data file comprising data related to locations of digital files constituting said multimedia content, said multimedia content, names of said one or more variables of said multimedia content, information pertaining to time, duration, start time, and end time of said multimedia content;
      an interactive media engine configured to execute said generated said first data file, said second data file and said data third file, wherein said execution defines one or more controls based on said selected values of said defined parameters for modifying one or more variables of said multimedia content;
      said interactive media player configured to communicate with said interactive media engine for rendering said multimedia content in accordance with said modified one or more variables on said interface displayed on said computing device of said second user; and
      said interactive media player configured to invoke an instance of said interactive media application at least on one another computing device for controlling playback of one or more pieces of said multimedia content on said at least one another computing device.

8. The computer implemented system of claim 7, wherein said interactive media application further comprises an interactive media engine authoring tool configured to enable said first user to author said multimedia content for providing said authored multimedia content to said second user.

9. The computer implemented system of claim 7, wherein said interactive media engine in communication with said interactive media player is configured to enable continuous modification of said one or more variables of said multimedia content by acquiring said control inputs from said second user for controlling said playback of said multimedia content in said real time.

10. The computer implemented system of claim 7, wherein said interactive media player renders said graphical representation of said defined one or more controls with said multimedia content on said interface displayed on said computing device of said second user in a three dimensional interactive environment for enabling said control of said playback of said multimedia content.

11. The computer implemented system of claim 7, wherein said interactive media player renders a plurality of graphical representations of one or more of said defined one or more controls with said multimedia content on said interface displayed on said computing device of said second user for modifying different sets of said one or more variables of said multimedia content.

12. The computer implemented system of claim 7, wherein said interactive media application further comprises a storage device configured to store digital files that constitute said multimedia content, said generated data files for said playback of said multimedia content, said plurality of controls for said multimedia content, said parameters associated with said controls, and data files.

13. A computer program product comprising computer executable instructions embodied in a non-transitory computer readable storage medium, wherein said computer program product comprises:
   a first computer program code for providing an interactive media application for playing back multimedia content;
   a second computer program code for enabling a first user to define one or more of a plurality of controls for said multimedia content and to define parameters associated with said defined one or more controls using said interactive media application;
   a third computer program code for rendering a graphical representation of said defined one or more controls with said multimedia content on an interface displayed on a computing device of a second user by said interactive media application;
   a fourth computer program code for acquiring one or more control inputs from said second user by said interactive media application, wherein said one or more control inputs acquired from said second user provide a selection of values for said defined parameters associated with said defined one or more controls;

a fifth computer program code for generating a plurality of data files by associating said acquired one or more control inputs, and said provided said selection of values for said defined parameters associated with said defined one or more controls by said interactive media application, comprising:

a first data file comprising data related to one or more playback patterns of said multimedia content;

a second data file comprising data related to said defined one or more controls, said defined parameters associated with said defined one or more controls, information regarding said one or more variables of said multimedia content to be modified corresponding to said defined parameters, and modes of modifying said one or more variables of said multimedia content, and a third data file comprising data related to locations of digital files constituting said multimedia content, said multimedia content, names of said one or more variables of said multimedia content, information pertaining to time, duration, start time, and end time of said multimedia content;

a sixth computer program code for executing said generated plurality of files, wherein said execution defines one or more controls based on said selected values of said defined parameters for modifying one or more variables of said multimedia content by said interactive media application;

a seventh computer program code for rendering said multimedia content in accordance with said modified one or more variables on said interface displayed on said computing device of said second user by said interactive media application; and an eighth computer program code invoking an instance of said interactive media application on at least one another computing device for controlling playback of one or more pieces of said multimedia content on said at least one another computing device.

14. A computer implemented method, executed by at least one processor, for controlling playback of multimedia content in real time, comprising:

providing an interactive media application for playing back said multimedia content;

defining one or more of a plurality of controls for said multimedia content by a first user and defining parameters associated with said defined one or more controls by said first user using said interactive media application;

rendering a graphical representation of said defined one or more controls with said multimedia content on an interface displayed on a computing device of a second user by said interactive media application;

acquiring one or more control inputs from said second user by said interactive media application, wherein said one or more control inputs acquired from said second user provide a selection of values for said defined parameters associated with said defined one or more controls;

executing said defined one or more controls based on said selected values of said defined parameters for modifying one or more variables of said multimedia content by said interactive media application;

rendering said multimedia content in accordance with said modified one or more variables on said interface displayed on said computing device of said second user by said interactive media application; and invoking an instance of said interactive media application on said computing device of said second user for controlling playback of one or more pieces of said multimedia content;

whereby said modification of said one or more variables of said multimedia content controls said playback of said multimedia content.

* * * * *